(12) United States Patent
Kidera et al.

(10) Patent No.: US 9,866,147 B2
(45) Date of Patent: Jan. 9, 2018

(54) POWER-CONVERTING DEVICE AND POWER CONDITIONER USING THE SAME

(71) Applicant: Panasonic Intellectual Property Management Co., Ltd., Osaka (JP)

(72) Inventors: Kazunori Kidera, Osaka (JP); Mitsuru Tanabe, Osaka (JP); Mariko Kifuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/306,332

(22) PCT Filed: May 27, 2015

(86) PCT No.: PCT/JP2015/002672
§ 371 (c)(1),
(2) Date: Oct. 24, 2016

(87) PCT Pub. No.: WO2015/182133
PCT Pub. Date: Dec. 3, 2015

(65) Prior Publication Data
US 2017/0047863 A1    Feb. 16, 2017

(30) Foreign Application Priority Data

May 29, 2014   (JP) ................ 2014-111785
Oct. 6, 2014   (JP) ................ 2014-205726

(51) Int. Cl.
*H02M 7/797*   (2006.01)
*H02M 7/483*   (2007.01)
(Continued)

(52) U.S. Cl.
CPC .......... *H02M 7/797* (2013.01); *H02M 1/12* (2013.01); *H02M 7/483* (2013.01); *H02M 1/36* (2013.01); *H02M 7/49* (2013.01)

(58) Field of Classification Search
CPC .......... H02M 1/12; H02M 1/36; H02M 7/483; H02M 7/49; H02M 7/797
See application file for complete search history.

(56) References Cited

U.S. PATENT DOCUMENTS

2007/0025126 A1    2/2007   Barbosa et al.
2008/0238214 A1*  10/2008   Barbosa ............... H02M 7/483
                                                307/113
(Continued)

FOREIGN PATENT DOCUMENTS

JP    4369425 B2     9/2009
JP    2010-093978 A   4/2010
(Continued)

OTHER PUBLICATIONS

International Search Report for corresponding International Application No. PCT/JP2015/002672 dated Aug. 18, 2015.
(Continued)

*Primary Examiner* — Adolf Berhane
*Assistant Examiner* — Bart Iliya
(74) *Attorney, Agent, or Firm* — Renner, Otto, Boisselle & Sklar, LLP

(57) ABSTRACT

A first bidirectional switch is electrically connected between a first connection point which is a connection point of a first switching element and a second switching element and a second connection point which is a connection point of a seventh switching element and an eighth switching element. A second bidirectional switch is electrically connected between a third connection point which is a connection point of a third switching element and a fourth switching element and a fourth connection point which is a connection point of a fifth switching element and a sixth switching element. A (Continued)

power-converting device is configured to generate an output voltage between a first output point and a second output point.

19 Claims, 18 Drawing Sheets

(51) Int. Cl.
*H02M 1/12* (2006.01)
*H02M 1/36* (2007.01)
*H02M 7/49* (2007.01)

(56) References Cited

U.S. PATENT DOCUMENTS

| | | | |
|---|---|---|---|
| 2009/0231896 A1* | 9/2009 | Barbosa | H02M 7/49 363/131 |
| 2013/0014384 A1* | 1/2013 | Xue | H02M 7/483 29/825 |
| 2013/0128624 A1* | 5/2013 | Tamura | H02M 3/33569 363/21.01 |
| 2014/0063884 A1 | 3/2014 | Itoh et al. | |

FOREIGN PATENT DOCUMENTS

| | | |
|---|---|---|
| JP | 2014-050134 A | 3/2014 |
| JP | 2014-064431 A | 4/2014 |
| JP | 2014-093839 A | 5/2014 |
| JP | 2016-092845 A | 5/2016 |
| JP | 2016-092846 A | 5/2016 |
| JP | 2016-092847 A | 5/2016 |
| JP | 2016-092848 A | 5/2016 |
| WO | WO 2005/036719 A1 | 4/2005 |
| WO | WO 2016/067613 A1 | 5/2016 |
| WO | WO 2016/067614 A1 | 5/2016 |

OTHER PUBLICATIONS

Form PCT/ISA/237 for corresponding International Application No. PCT/JP2015/002672 dated Aug. 18, 2015.

* cited by examiner

POWER-CONVERTING DEVICE AND POWER CONDITIONER USING THE SAME

TECHNICAL FIELD

The present invention generally relates to power-converting devices and power conditioners using the same, and more specifically to a power-converting device for converting power from a direct current power supply and a power conditioner using the same.

BACKGROUND ART

Along with recent widespread use of photovoltaic generators, fuel cells, power storage apparatuses, and other such apparatuses for dwellings, various circuits have been proposed and provided as power-converting devices for converting outputs from direct current power supplies of such apparatuses into alternate currents. For example, JP 2014-64431 A (paragraphs [0002] to [0006], FIGS. 16 and 17, hereinafter referred to as Document 1) and JP 4369425 B2 (hereinafter referred to as Document 2) disclose a power-converting device ("multilevel power conversion device" in Document 1, "converter circuit" in Document 2) configured to generate alternate current outputs at a plurality of voltage levels by converting voltages from a direct-current voltage source.

According to the description of Document 1, the power conversion device is a five-level inverter configured to output voltages at five levels and includes two direct current capacitors, two flying capacitors, and ten switching elements. This power conversion device controls each switching element such that the voltage of each direct current capacitor is E/2 and the voltage of each flying capacitor is E/4 with a direct-current voltage E being applied to a series circuit of the two direct current capacitors, thereby outputting voltages at five levels.

When the power-converting device described in Documents 1 and 2 outputs voltages at five levels (five stages) as described above, a current input from the direct-current voltage source has to pass through six of the ten switching elements. Such a power-converting device has a relatively large sum of conduction losses (losses) of the switching elements. Thus, there are demands for a further improvement in power conversion efficiency.

SUMMARY OF INVENTION

In view of the foregoing, it is an object of the present invention to provide a power-converting device whose power conversion efficiency can be further improved and to provide a power conditioner including the power-converting device.

A power-converting device according to one aspect of the present invention is a power-converting device, including: a first conversion circuit; a second conversion circuit; a first bidirectional switch; and a second bidirectional switch, wherein the first conversion circuit and the second conversion circuit are electrically connected in parallel with each other between a first input point on a high potential side of a direct current power supply and a second input point on a low potential side of the direct current power supply, the first conversion circuit includes first to fourth switching elements electrically connected in series with each other between the first input point and the second input point in an order of the first switching element, the second switching element, the third switching element, and the fourth switching element from the first input point, and a first capacitor electrically connected in parallel with a series circuit of the second switching element and the third switching element, a connection point of the second switching element and the third switching element being a first output point, the second conversion circuit includes fifth to eighth switching elements electrically connected in series with each other between the first input point and the second input point in an order of the fifth switching element, the sixth switching element, the seventh switching element, and the eighth switching element from the first input point, and a second capacitor electrically connected in parallel with a series circuit of the sixth switching element and the seventh switching element, a connection point of the sixth switching element and the seventh switching element being a second output point, the first bidirectional switch is electrically connected between a first connection point which is a connection point of the first switching element and the second switching element and a second connection point which is a connection point of the seventh switching element and the eighth switching element, the second bidirectional switch is electrically connected between a third connection point which is a connection point of the third switching element and the fourth switching element and a fourth connection point which is a connection point of the fifth switching element and the sixth switching element, and the power-converting device is configured to generate an output voltage between the first output point and the second output point.

A power conditioner according to one aspect of the present invention includes the power-converting device, and a disconnection device electrically connected between each of the first output point and the second output point and each of system power supplies.

According to the configurations of the aspects, the power conversion efficiency can be further improved.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS (First Embodiment)

Figure 1:
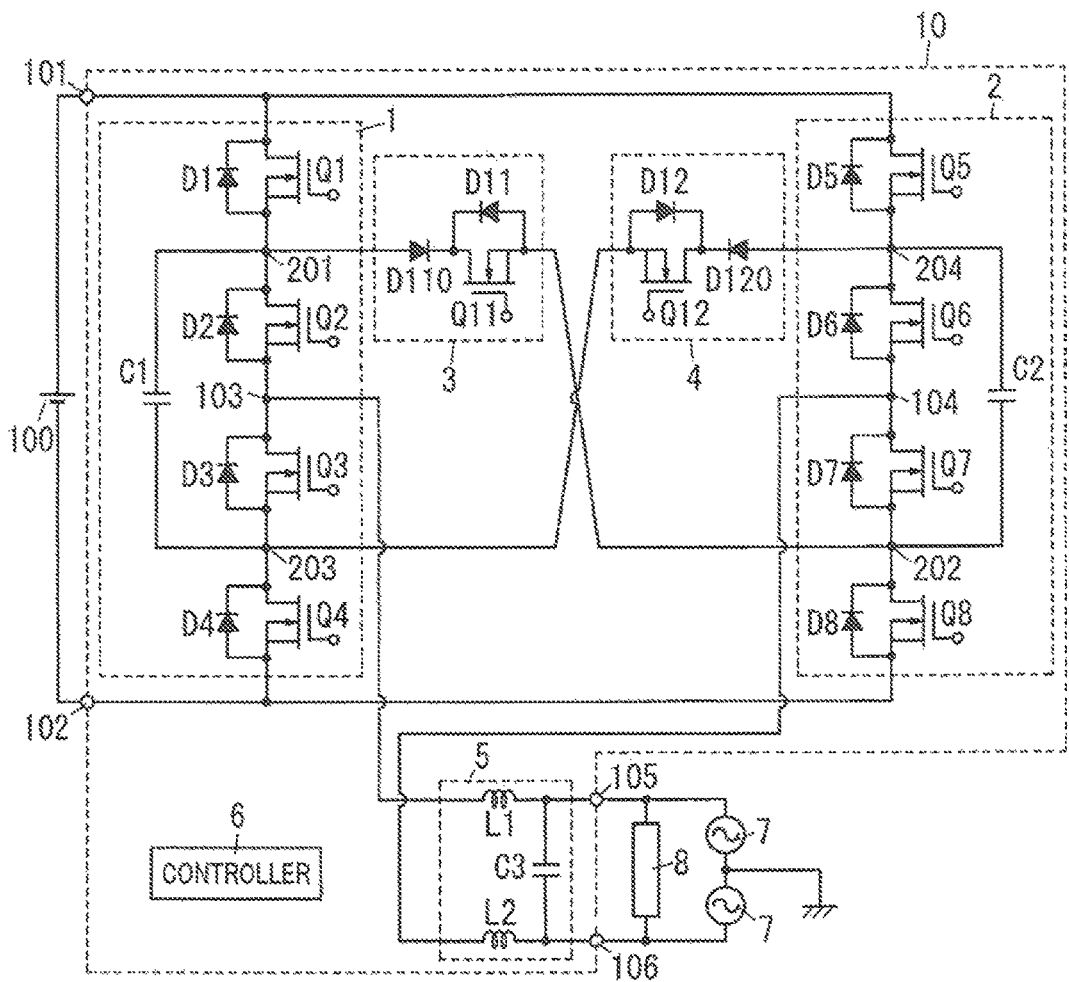
FIG. 1 is a circuit diagram illustrating the configuration of a power-converting device according to a first embodiment.

As illustrated in FIG. 1, a power-converting device 10 according to the present embodiment includes a first conversion circuit 1 and a second conversion circuit 2 and further includes a first bidirectional switch 3 and a second bidirectional switch 4.

The first conversion circuit 1 and the second conversion circuit 2 are electrically connected in parallel with each other between a first input point 101 on a high potential side of a direct current power supply 100 and a second input point 102 on a low potential side of the direct current power supply 100.

The first conversion circuit 1 includes first to fourth switching elements Q1 to Q4 and a first capacitor C1. The first conversion circuit 1 includes a first output point 103 which is a connection point of the second switching element Q2 and the third switching element Q3.

The first to fourth switching elements Q1 to Q4 are electrically connected in series with each other between the first input point 101 and the second input point 102. The first to fourth switching elements Q1 to Q4 are connected in series in the order of the first switching element Q1, the second switching element Q2, the third switching element Q3, and the fourth switching element Q4 from the first input point 101. The first capacitor C1 is electrically connected in parallel with a series circuit of the second switching element Q2 and the third switching element Q3.

The second conversion circuit 2 includes fifth to eighth switching elements Q5 to Q8 and a second capacitor C2. The second conversion circuit 2 includes a second output point 104 which is a connection point of the sixth switching element Q6 and the seventh switching element Q7.

The fifth to eighth switching elements Q5 to Q8 are electrically connected in series with each other between the first input point 101 and the second input point 102. The fifth to eighth switching elements Q5 to Q8 are connected in series with each other in the order of the fifth switching element Q5, the sixth switching element Q6, the seventh switching element Q7, and the eighth switching element Q8 from the first input point 101. The second capacitor C2 is electrically connected in parallel with a series circuit of the sixth switching element Q6 and the seventh switching element Q7.

The first bidirectional switch 3 is electrically connected between a first connection point 201 which is a connection point of the first switching element Q1 and the second switching element Q2 and a second connection point 202 which is a connection point of the seventh switching element Q7 and the eighth switching element Q8.

The second bidirectional switch 4 is electrically connected between a third connection point 203 which is a connection point of the third switching element Q3 and the fourth switching element Q4 and a fourth connection point 204 which is a connection point of the fifth switching element Q5 and the sixth switching element Q6.

The power-converting device 10 is configured to generate an adjusted output voltage between the first output point 103 and the second output point 104.

The power-converting device 10 according to the present embodiment and a power conditioner 20 (see FIG. 7) including the power-converting device 10 will be described in detail below. Note that the following configurations are mere examples of the present invention. The present invention is not limited to the present embodiment (first embodiment) and the following embodiments (second and third embodiments). Even in embodiments other than these embodiments, various modifications may be made depending on design, and the like without departing from the technical idea of the present invention.

In the present embodiment, an example is illustrated in which the power conditioner 20 is a power conditioner used for dwellings by being electrically connected to a photovoltaic generator serving as the direct current power supply 100, but this example does not intend to limit the application of the power conditioner 20. The power conditioner 20 may be used in electrical connection with a direct current power supply 100 such as a fuel cell or a power storage apparatus for dwellings other than the photovoltaic generator. The power conditioner 20 may also be used in, for example, shops, factories, and offices other than dwellings. The application of the power-converting device 10 is not limited to the power conditioner 20. The power-converting device 10 may be used in apparatuses other than the power conditioner 20.

<Configuration of Power-Converting Device>

As illustrated in FIG. 1, the power-converting device 10 of the present embodiment is electrically connected to the direct current power supply 100 including a photovoltaic generator via a connection box. In the present embodiment, the power-converting device 10 includes a filter circuit 5 and a controller 6 in addition to the first conversion circuit 1, the second conversion circuit 2, the first bidirectional switch 3, and the second bidirectional switch 4.

The first input point 101 and the second input point 102 serve as a pair of input terminals of the power-converting device 10. The direct current power supply 100 is electrically connected between the input terminals (the first input point 101 and the second input point 102) in the pair. In the present embodiment, the direct current power supply 100 is a photovoltaic generator.

The first output point 103 of the first conversion circuit 1 and the second output point 104 of the second conversion circuit 2 are electrically connected to a third output point 105 and a fourth output point 106, respectively via the filter circuit 5. In the present embodiment, the third output point 105 and the fourth output point 106 correspond to a pair of output terminals of the power-converting device 10.

In the present embodiment, the output voltage of the power-converting device 10 is an alternate current voltage, and the third output point 105 and the fourth output point 106 are electrically connected to system power supplies (commercial power grids) 7. The third output point 105 and the fourth output point 106 are also electrically connected to a load 8 which operates when supplied with alternate current power.

Specifically, the pair of output terminals of the power-converting device 10 is electrically connected to an interconnection breaker disposed on a distribution board, thereby being connected to the load 8 and system power supplies 7. That is, the power-converting device 10 converts direct current power input from the direct current power supply 100 into alternate current power and outputs the alternate current power from the pair of output terminals (the third output point 105 and the fourth output point 106) to the load 8 and the system power supplies 7. Note that in FIG. 1, each system power supply 7 is a single phase three-wire system having a U phase or a W phase but is not limited to this example, and each system power supply 7 may be a single phase two-wire system.

Next, the configuration of each component of the power-converting device 10 will be described in detail.

The power-converting device 10 includes the pair of input terminals connected to the direct current power supply 100, wherein the input terminal on a high potential (positive electrode) side of the direct current power supply 100 is the first input point 101, and the input terminal on a low potential (negative electrode) side of the direct current power supply 100 is the second input point 102. Therefore, a direct-current voltage output from the direct current power supply 100 is applied as an input voltage between the first input point 101 and the second input point 102.

Here, the input terminal (the second input point 102) on the low potential side of the direct current power supply 100 is assumed to be circuit ground of the power-converting device 10 and to have a potential of 0[V]. In this case, the potential of the first input point 101 is represented by E[V] by using the output voltage E[V] of the direct current power supply 100.

As described above, the first conversion circuit 1 includes the first to fourth switching elements Q1 to Q4 and the first capacitor C1. The first to fourth switching elements Q1 to Q4 are connected in series with each other between the first input point 101 and the second input point 102. Here, each of the first to fourth switching elements Q1 to Q4 is, for example, a depletion type n-channel Metal-Oxide-Semiconductor Field Effect Transistor (MOSFET).

The drain of the first switching element Q1 is electrically connected to the first input point 101. The drain of the second switching element Q2 is electrically connected to the source of the first switching element Q1. The drain of the third switching element Q3 is electrically connected to the source of the second switching element Q2. The drain of the fourth switching element Q4 is electrically connected to the source of the third switching element Q3. The source of the fourth switching element Q4 is electrically connected to the second input point 102.

The connection point of the source of the second switching element Q2 and the drain of the third switching element Q3 corresponds to the first output point 103. The connection point of the source of the first switching element Q1 and the drain of the second switching element Q2 corresponds to the first connection point 201. The connection point of the source of the third switching element Q3 and the drain of the fourth switching element Q4 corresponds to the third connection point 203.

The first capacitor C1 has its one end electrically connected to the drain of the second switching element Q2 (the first connection point 201) and its other end electrically connected to the source of the third switching element Q3 (the third connection point 203). In other words, one end of the first capacitor C1 is electrically connected to the first input point 101 via the first switching element Q1, and the other end of the first capacitor C1 is electrically connected to the second input point 102 via the fourth switching element Q4.

As described above, the second conversion circuit 2 includes the fifth to eighth switching elements Q5 to Q8 and the second capacitor C2. The fifth to eighth switching elements Q5 to Q8 are connected in series with each other between the first input point 101 and the second input point 102. The second conversion circuit 2 has basically the same configuration as the first conversion circuit 1, wherein the fifth to eighth switching elements Q5 to Q8 correspond to the first to fourth switching elements Q1 to Q4, and the second capacitor C2 corresponds to the first capacitor C1. Each of the fifth to eighth switching elements Q5 to Q8 is a depletion type n-channel MOSFET as in the case of each of the first to fourth switching elements Q1 to Q4.

That is, the drain of the fifth switching element Q5 is electrically connected to the first input point 101. The drain of the sixth switching element Q6 is electrically connected to the source of the fifth switching element Q5. The drain of the seventh switching element Q7 is electrically connected to the source of the sixth switching element Q6. The drain of the eighth switching element Q8 is electrically connected to the source of the seventh switching element Q7. The source of the eighth switching element Q8 is electrically connected to the second input point 102.

The connection point of the source of the sixth switching element Q6 and the drain of the seventh switching element Q7 corresponds to the second output point 104. The connection point of the source of the fifth switching element Q5 and the drain of the sixth switching element Q6 corresponds to the fourth connection point 204. The connection point of the source of the seventh switching element Q7 and the drain of the eighth switching element Q8 corresponds to the second connection point 202.

The second capacitor C2 has its one end electrically connected to the drain of the sixth switching element Q6 (the fourth connection point 204) and its other end electrically connected to the source of the seventh switching element Q7 (the second connection point 202). In other words, one end of the second capacitor C2 is electrically connected to the first input point 101 via the fifth switching element Q5, and the other end of the second capacitor C2 is electrically connected to the second input point 102 via the eighth switching element Q8.

The circuit constant (capacitance) of the second capacitor C2 is equivalent to the circuit constant (capacitance) of the first capacitor C1.

In FIG. 1, first to eighth diodes D1 to D8 are respectively connected in anti-parallel with the first to eighth switching elements Q1 to Q8. These first to eighth diodes D1 to D8 are parasitic diodes of the first to eighth switching elements Q1 to Q8, respectively. That is, the parasitic diode of the first switching element Q1 is the first diode D1, and in a similar manner, the parasitic diodes of the second switching element Q2, the third switching element Q3, . . . are respectively the second diode D2, the third diode D3, . . . . For example, the first diode D1 is connected with its cathode and anode respectively facing the drain and the source of the first switching element Q1.

The first conversion circuit 1 and the second conversion circuit 2 having such a configuration are electrically connected in parallel with each other between the first input point 101 and the second input point 102. That is, the first conversion circuit 1 and the second conversion circuit 2 are connected in parallel with each other between the two ends of the direct current power supply 100.

The first bidirectional switch 3 is electrically connected between the first connection point 201 and the second connection point 202. That is, the first connection point 201 of the first conversion circuit 1 is electrically connected to the second connection point 202 of the second conversion circuit 2 via the first bidirectional switch 3. Here, the first bidirectional switch 3 includes a ninth diode D110 and a first switch Q11 electrically connected in series with each other between the first connection point 201 and the second connection point 202. In the first bidirectional switch 3, the ninth diode D110 and the first switch Q11 are connected in this order from the first connection point 201.

Specifically, the first switch Q11 is a depletion type n-channel MOSFET as in the case of each of the first to eighth switching elements Q1 to Q8. The ninth diode D110 has an anode connected to the first connection point 201 and a cathode connected to the drain of the first switch Q11. The source of the first switch Q11 is connected to the second connection point 202.

The second bidirectional switch 4 is electrically connected between the third connection point 203 and the fourth connection point 204. That is, the third connection point 203 of the first conversion circuit 1 is electrically connected to the fourth connection point 204 of the second conversion circuit 2 via the second bidirectional switch 4. Here, the second bidirectional switch 4 includes a tenth diode D120 and a second switch Q12 electrically connected in series with each other between the third connection point 203 and the fourth connection point 204. In the second bidirectional switch 4, the tenth diode D120 and the second switch Q12 are connected in this order from the fourth connection point 204.

Specifically, the second switch Q12 is a depletion type n-channel MOSFET as in the case of each of the first to eighth switching elements Q1 to Q8. The tenth diode D120 has an anode connected to the fourth connection point 204 and a cathode connected to the drain of the second switch Q12. The source of the second switch Q12 is connected to the third connection point 203.

Moreover, eleventh and twelfth diodes D11 and D12 which are parasitic diodes are respectively connected in anti-parallel with the first switch Q11 and the second switch Q12. The eleventh diode D11 is connected with its cathode and anode respectively facing the drain and the source of the first switch Q11. The twelfth diode D12 is connected with its cathode and anode respectively facing the drain and the source of the second switch Q12.

The bidirectional switch (each of the first bidirectional switch 3 and the second bidirectional switch 4) here is a switch configured to allow a current to pass at least in one direction in an on state and to shut off a current in all directions in an off state. That is, the first bidirectional switch 3 allows a current to pass at least in one direction in the on state and shuts off a bidirectional flow of a current in the off state between the first connection point 201 and the second connection point 202. The second bidirectional switch 4 allows a current to pass at least in one direction in the on state and shuts off a bidirectional flow of a current in the off state between the third connection point 203 and the fourth connection point 204.

In the present embodiment, the direction of a current which is allowed to flow in the on state of each of the first bidirectional switch 3 and the second bidirectional switch 4 is limited to one direction by the ninth diode D110 and the tenth diode D120. However, the bidirectional switch (each of the first bidirectional switch 3 and the second bidirectional switch 4) may be configured to allow a current to pass at least in one direction or to allow a current to pass bidirectionally in the on state. Each of the first bidirectional switch 3 and the second bidirectional switch 4 may be a bidirectional switch having a double gate (dual gate) structure and including a wide bandgap semiconductor material such as gallium nitride (GaN).

When the configuration is described in other words, the first bidirectional switch 3 is electrically connected between a positive electrode-side terminal of the first capacitor C1 and a negative electrode-side terminal of the second capacitor C2. The second bidirectional switch 4 is electrically connected between a negative electrode-side terminal of the first capacitor C1 and a positive electrode-side terminal of the second capacitor C2. That is, the first capacitor C1 of the first conversion circuit 1 and the second capacitor C2 of the second conversion circuit 2 are connected in the form of X via the first bidirectional switch 3 and the second bidirectional switch 4.

The first to eighth switching elements Q1 to Q8 and the first and second switches Q11 and Q12 each have a gate electrically connected to the controller 6. The controller 6 is capable of individually switching on/off the first to fourth switching elements Q1 to Q4, thereby controlling the first conversion circuit 1. The controller 6 is capable of individually switching on/off the fifth to eighth switching elements Q5 to Q8, thereby controlling the second conversion circuit 2. The controller 6 is capable of individually switching on/off the first and second switches Q11 and Q12, thereby controlling the first bidirectional switch 3 and the second bidirectional switch 4.

Note that controllers 6 may be individually provided to the first conversion circuit 1, the second conversion circuit 2, the first bidirectional switch 3, and the second bidirectional switch 4.

As illustrated in FIG. 1, the filter circuit 5 includes a pair of inductors L1 and L2 and a third capacitor C3. The inductor L1 is electrically connected between the first output point 103 and the third output point 105. The inductor L2 is electrically connected between the second output point 104 and the fourth output point 106. Note that the inductor (at least one of the inductors L1 and L2) may be electrically connected between at least one of the first output point 103 and the second output point 104 and the output terminal (the third output point 105, the fourth output point 106), and one of the inductors L1 and L2 may be omitted. That is, only the inductor L1 may be electrically connected between the first output point 103 and the third output point 105, or only the inductor L2 may be electrically connected between the second output point 104 and the fourth output point 106.

The third capacitor C3 is electrically connected between the third output point 105 and the fourth output point 106. In other words, the filter circuit 5 is a series circuit including the inductor L1, the third capacitor C3, and the inductor L2 electrically connected between the first output point 103 and the second output point 104.

<Basic Operation of Power-Converting Device>

Basic operation of the power-converting device 10 having the above-described configuration will be briefly described with reference to FIGS. 2A, 2B, 3A, 3B, 4A, 4B, 5A, and 5B. Note that the bold arrows in the figure represent current paths, and switching elements (or switches) circled by a dotted line represent elements through which a current passes.

The basic operation of the power-converting device 10 here means operation of the power-converting device 10 after the lapse of a time period from a start of power supply from the direct current power supply 100 to completion of charging of the first capacitor C1 and the second capacitor C2 to reference voltages (hereinafter referred to as a "start time period"). That is, the basic operation of the power-converting device 10 is operation of the power-converting device 10 started with the first capacitor C1 and the second capacitor C2 having been charged to the reference voltages.

The reference voltage for the first capacitor C1 is a voltage which is ¼ of an applied voltage applied between the first input point 101 and the second input point 102 from the direct current power supply 100. The reference voltage for the second capacitor C2 is a voltage which is also ¼ of the applied voltage applied between the first input point 101 and the second input point 102 from the direct current power supply 100.

It is assumed hereinafter that the output voltage of the direct current power supply 100 is E[V], the potential of the first input point 101 is E[V], and the potential of the second input point 102 is 0[V]. Here, the voltage across each of the first capacitor C1 and the second capacitor C2 charged to the reference voltage is E/4[V]. In the following description, it is assumed that the potential difference between the first output point 103 and the second output point 104, that is, a voltage generated between the first output point 103 and the second output point 104 is the output voltage of the power-converting device 10.

Note that since the third output point 105 and the fourth output point 106 are electrically connected to the system power supplies 7, the potential difference between the third output point 105 and the fourth output point 106, that is, a voltage generated between the third output point 105 and the fourth output point 106 is equal to the output voltage of the system power supply 7. The filter circuit 5 absorbs the potential difference between the first output point 103 and the third output point 105 and the potential difference between the second output point 104 and the fourth output point 106.

The power-converting device 10 switches the first conversion circuit 1, the second conversion circuit 2, the first bidirectional switch 3, and the second bidirectional switch 4 between first to eighth, i.e., a total of eight modes. With this operation, the power-converting device 10 converts the direct-current voltage (E[V]) applied between the first input point 101 and the second input point 102 into an alternate current voltage to generate an output voltage between the first output point 103 and the second output point 104. In the following description, the first to eighth switching elements Q1 to Q8 and the first and second switches Q11 and Q12 are in the "off" state unless otherwise stated as to their on/off states. It is also assumed that voltage drops across the first to eighth switching elements Q1 to Q8 and the first and second switches Q11 and Q12 and voltage drops across the ninth and tenth diodes D110 and D120 are negligible.

Here, the controller 6 controls each of the first to eighth switching elements Q1 to Q8 and the first and second switches Q11 and Q12 in accordance with the following two conditions.

The first condition is that the first to fourth switching elements Q1 to Q4 of the first conversion circuit 1 form a pair with the fifth to eighth switching elements Q5 to Q8 of the second conversion circuit 2 on a one-to-one basis, and each pair is switched on/off. Here, the first and eighth switching elements Q1 and Q8 are paired, the second and seventh switching elements Q2 and Q7 are paired, the third and sixth switching elements Q3 and Q6 are paired, and the fourth and fifth switching elements Q4 and Q5 are paired.

The second condition is that the second switching element Q2 and the third switching element Q3 are not simultaneously in the on state or are not simultaneously in the off state. Moreover, in the first to fourth modes, the first switching element Q1 and the second switch Q12 are not simultaneously in the on state or are not simultaneously in the off state, and in the fifth to eighth modes, the fourth switching element Q4 and the first switch Q11 are not simultaneously in the on state or are not simultaneously in the off state.

Figure 2A:
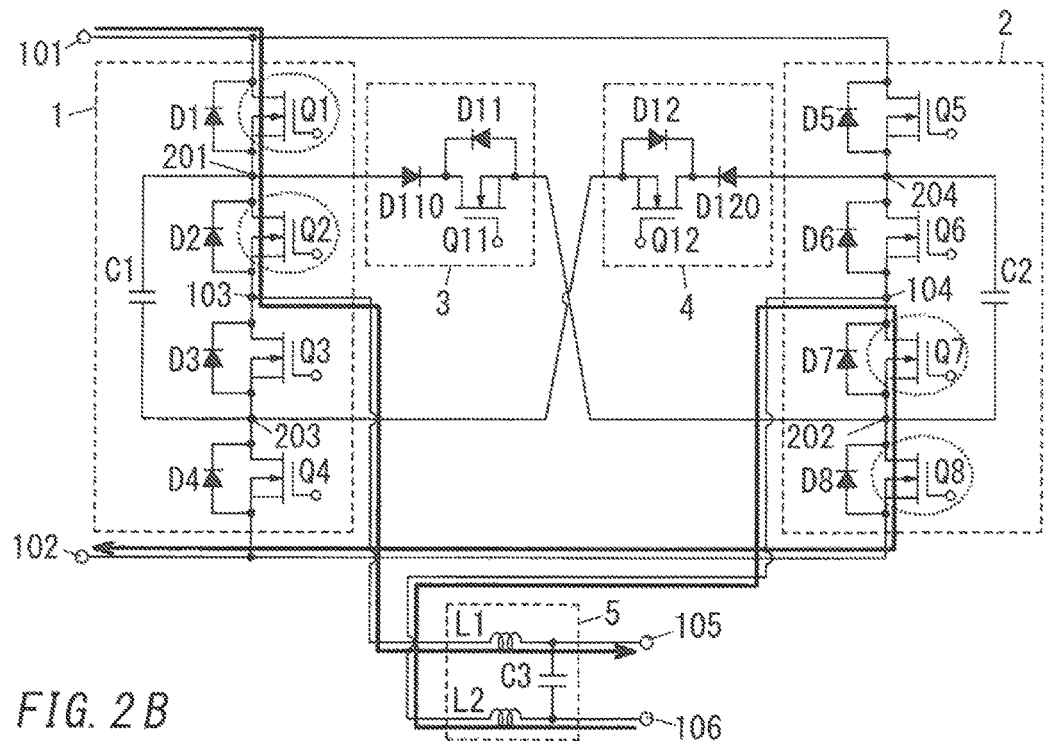
FIG. 2A is a view illustrating a first mode of the power-converting device according to the first embodiment.

First, in the first mode illustrated in FIG. 2A, the first and second switching elements Q1 and Q2 of the first conversion circuit 1 and the seventh and eighth switching elements Q7 and Q8 of the second conversion circuit 2 are in the on state. In this state, as illustrated in FIG. 2A, the first input point 101 is electrically connected to the first output point 103 via the first switching element Q1 and the second switching element Q2. The second input point 102 is electrically connected to the second output point 104 via the eighth switching element Q8 and the seventh switching element Q7. At this time, a current flows through a total of four elements, i.e., the first, second, seventh, and eighth switching elements Q1, Q2, Q7, and Q8 of the semiconductor elements (the switching elements, the switches, and the diodes).

Therefore, the first output point 103 is equivalent in potential (E[V]) to the first input point 101, and the second output point 104 is equivalent in potential (0[V]) to the second input point 102. Thus, the output voltage of the power-converting device 10 generated between the first output point 103 and the second output point 104 is E (=E−0)[V]. In this case, the potential of the third output point 105 is a potential obtained by subtracting the voltage across the inductor L1 from the potential of the first output point 103, and the potential of the fourth output point 106 is a potential obtained by adding the voltage across the inductor L2 to the potential of the second output point 104.

Figure 2B:
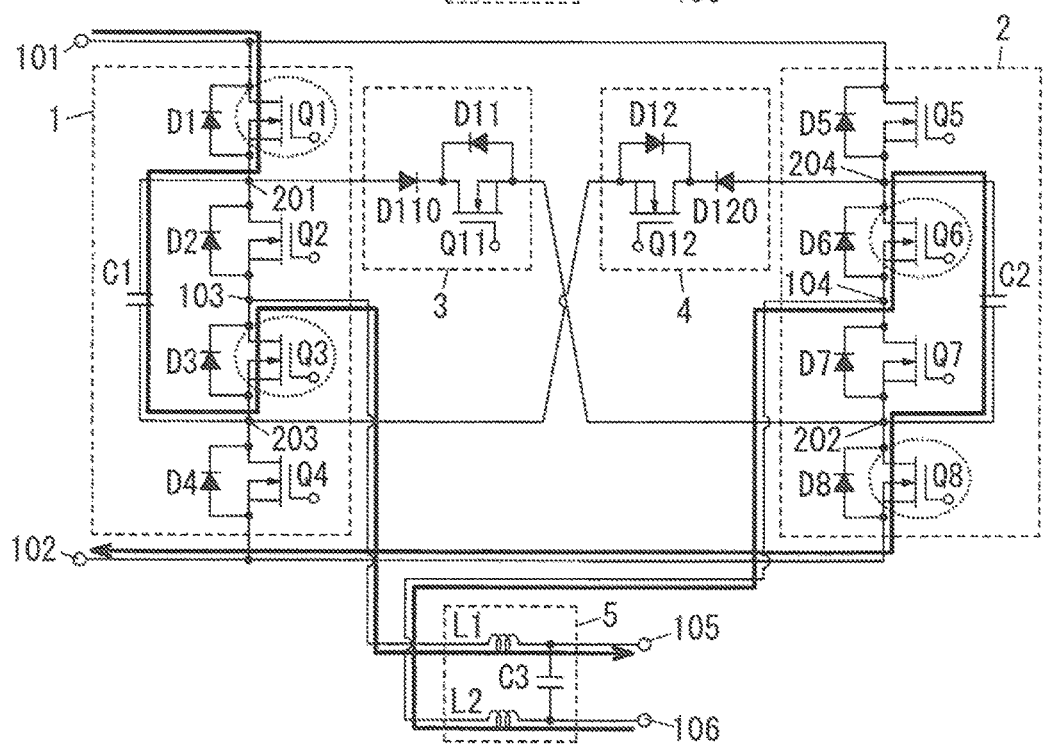
FIG. 2B is a view illustrating a second mode of the power-converting device according to the first embodiment.

Next, in the second mode illustrated in FIG. 2B, the first and third switching elements Q1 and Q3 of the first conversion circuit 1 and the sixth and eighth switching elements Q6 and Q8 of the second conversion circuit 2 are in the on state. In this state, as illustrated in FIG. 2B, the first input point 101 is electrically connected to the first output point 103 via the first switching element Q1, the first capacitor C1, and the third switching element Q3. The second input point 102 is electrically connected to the second output point 104 via the eighth switching element Q8, the second capacitor C2, and the sixth switching element Q6. At this time, a current flows through a total of four elements, i.e., the first, third, sixth, and eighth switching elements Q1, Q3, Q6, and Q8 of the semiconductor elements (the switching elements, the switches, and the diodes).

Therefore, the potential of the first output point 103 is lower than the potential (E[V]) of the first input point 101 by the voltage (E/4[V]) across the first capacitor C1, that is, the potential of the first output point 103 is 3E/4 (=E−E/4)[V]. Moreover, the potential of the second output point 104 is higher than the potential (0[V]) of the second input point 102 by the voltage (E/4[V]) across the second capacitor C2, that is, the potential of the second output point 104 is E/4 (=0+E/4)[V]. Thus, the output voltage of the power-converting device 10 generated between the first output point 103 and the second output point 104 is E/2 (=3E/4−E/4)[V]. In this case, the potential of the third output point 105 is a potential obtained by subtracting the voltage across the inductor L1 from the potential of the first output point 103, and the potential of the fourth output point 106 is a potential obtained by adding the voltage across the inductor L2 to the potential of the second output point 104.

Figure 3A:
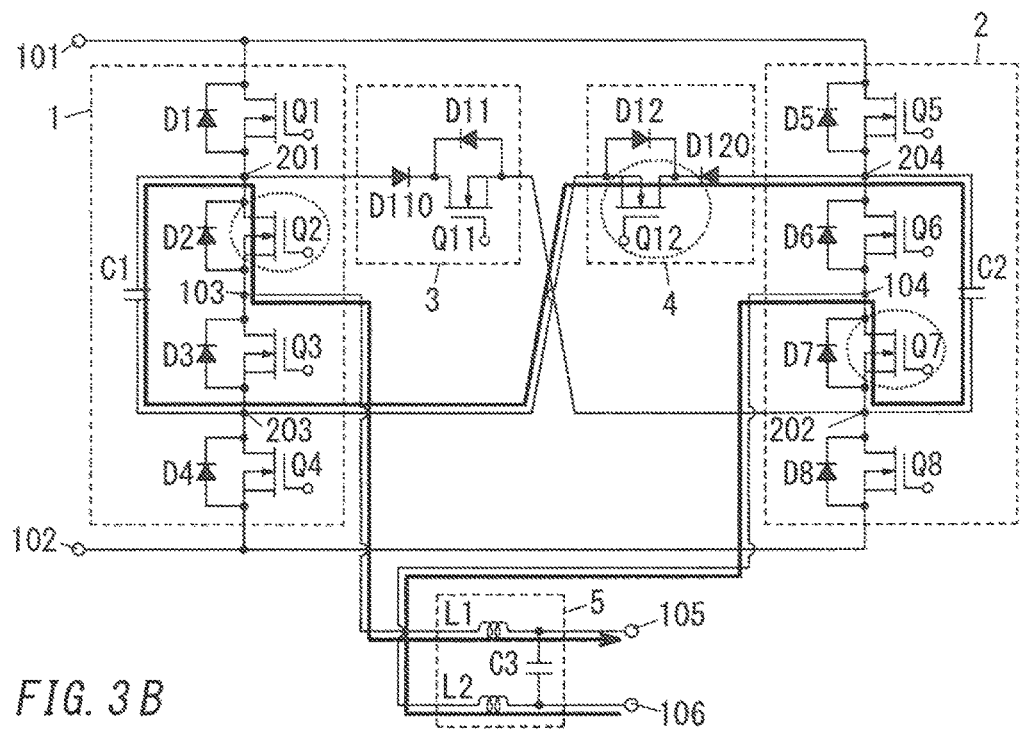
FIG. 3A is a view illustrating a third mode of the power-converting device according to the first embodiment.

Next, in the third mode illustrated in FIG. 3A, the second switching element Q2 of the first conversion circuit 1, the seventh switching element Q7 of the second conversion circuit 2, and the second switch Q12 of the second bidirectional switch 4 are in the on state. In this state, the second output point 104 is electrically connected to the first output point 103 via the seventh switching element Q7, the second capacitor C2, the tenth diode D120, the second switch Q12, the first capacitor C1, and the second switching element Q2. At this time, a current flows through a total of four elements, i.e., the second and seventh switching elements Q2 and Q7, the second switch Q12, and the tenth diode D120 of the semiconductor elements (the switching elements, the switches, and the diodes).

Therefore, the potential of the first output point 103 is higher than the potential of the second output point 104 by the sum of the voltage (E/4[V]) across the first capacitor C1 and the voltage (E/4[V]) of the second capacitor C2. Thus, the output voltage of the power-converting device 10 generated between the first output point 103 and the second output point 104 is E/2 (=E/4+E/4)[V]. In this case, the potential of the third output point 105 is a potential obtained by subtracting the voltage across the inductor L1 from the potential of the first output point 103, and the potential of the fourth output point 106 is a potential obtained by adding the voltage across the inductor L2 to the potential of the second output point 104.

Figure 3B:
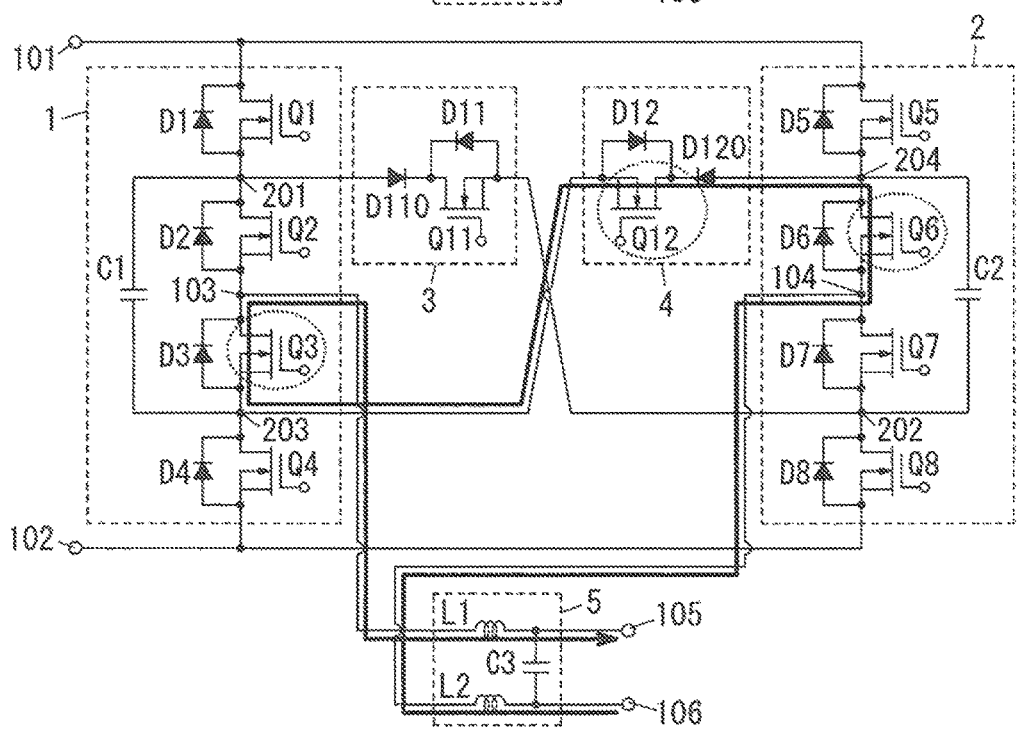
FIG. 3B is a view illustrating a fourth mode of the power-converting device according to the first embodiment.

Next, in the fourth mode illustrated in FIG. 3B, the third switching element Q3 of the first conversion circuit 1, the sixth switching element Q6 of the second conversion circuit 2, and the second switch Q12 of the second bidirectional switch 4 are in the on state. In this state, the second output point 104 is electrically connected to the first output point 103 via the sixth switching element Q6, the tenth diode D120, the second switch Q12, and the third switching element Q3. At this time, a current flows through a total of four elements, i.e., the third and sixth switching elements Q3 and Q6, the second switch Q12, and the tenth diode D120 of the semiconductor elements (the switching elements, the switches, and the diodes).

Therefore, the potential of the first output point 103 is equivalent to the potential of the second output point 104. Thus, the output voltage of the power-converting device 10 generated between the first output point 103 and the second output point 104 is 0[V]. In this case, the potential of the third output point 105 is a potential obtained by subtracting the voltage across the inductor L1 from the potential of the first output point 103, and the potential of the fourth output point 106 is a potential obtained by adding the voltage across the inductor L2 to the potential of the second output point 104.

In the fifth to eighth modes, the power-converting device 10 operates based on the first to fourth modes with operation of the first conversion circuit 1 and operation of the second conversion circuit 2 being interchanged and operation of the first bidirectional switch 3 and operation of the second bidirectional switch 4 being interchanged. That is, the operation of the first conversion circuit 1 and the first bidirectional switch 3 and the operation of the second conversion circuit 2 and the second bidirectional switch 4 in the fifth to eighth modes are symmetrical with respect to those in the first to fourth modes.

Figure 4A:
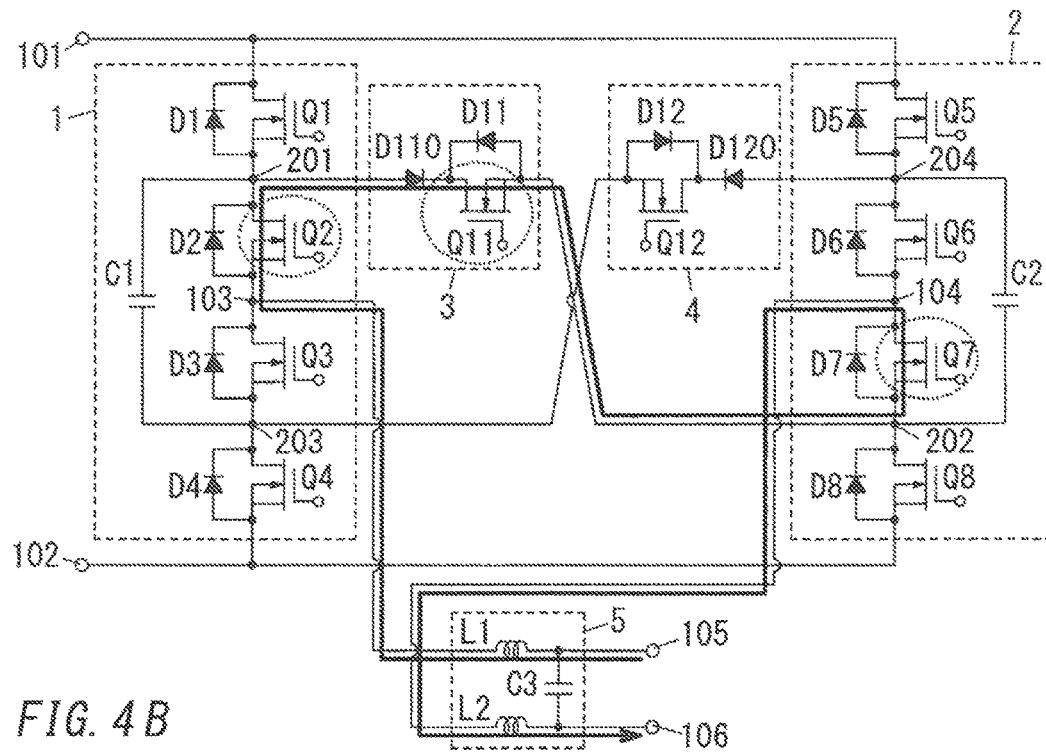
FIG. 4A is a view illustrating a fifth mode of the power-converting device according to the first embodiment.

That is, in the fifth mode illustrated in FIG. 4A, the second switching element Q2 of the first conversion circuit 1, the seventh switching element Q7 of the second conversion circuit 2, and the first switch Q11 of the first bidirectional switch 3 are in the on state symmetrically with respect to the fourth mode. In this state, as illustrated in FIG. 4A, the first output point 103 is electrically connected to the second output point 104 via the second switching element Q2, the ninth diode D110, the first switch Q11, and the seventh switching element Q7. At this time, a current flows through a total of four elements, i.e., the second and seventh switching elements Q2 and Q7, the first switch Q11, and the ninth diode D110 of the semiconductor elements (the switching elements, the switches, and the diodes).

Therefore, the potential of the first output point 103 is equivalent to the potential of the second output point 104. Thus, the output voltage of the power-converting device 10 generated between the first output point 103 and the second output point 104 is 0[V]. In this case, the potential of the third output point 105 is a potential obtained by adding the voltage across the inductor L1 to the potential of the first output point 103, and the potential of the fourth output point 106 is a potential obtained by subtracting the voltage across the inductor L2 from the potential of the second output point 104.

Figure 4B:
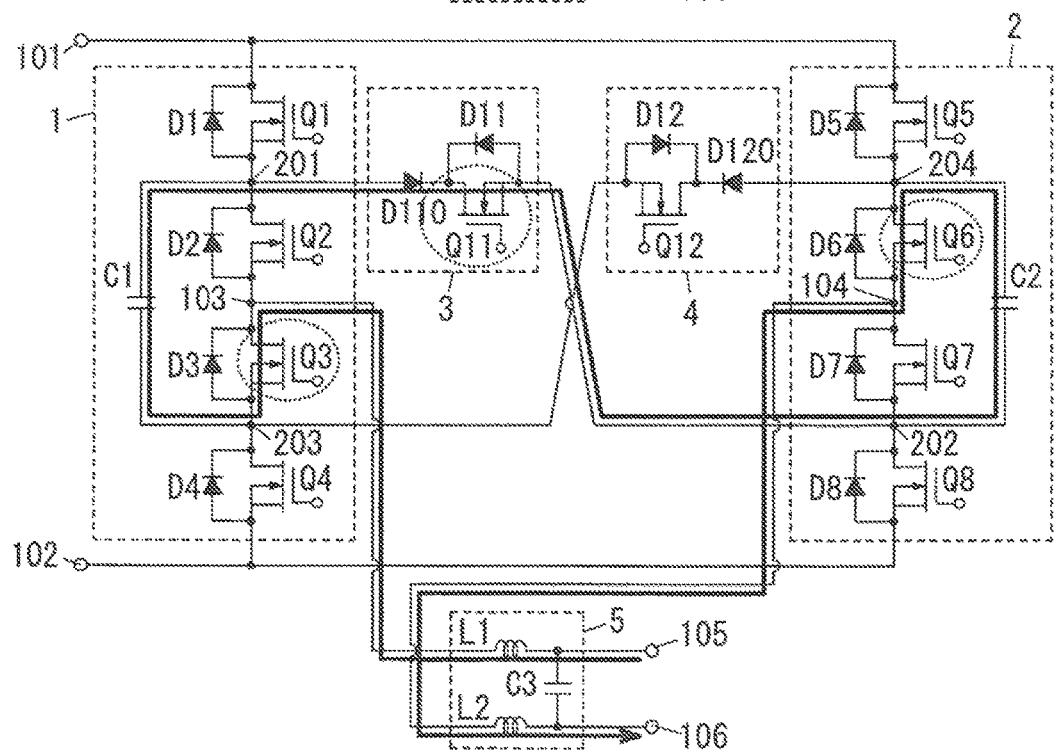
FIG. 4B is a view illustrating a sixth mode of the power-converting device according to the first embodiment.

Next, in the sixth mode illustrated in FIG. 4B, the third switching element Q3 of the first conversion circuit 1, the sixth switching element Q6 of the second conversion circuit 2, and the first switch Q11 of the first bidirectional switch 3 are in the on state symmetrically with respect to the third mode. In this state, the first output point 103 is electrically connected to the second output point 104 via the third switching element Q3, the first capacitor C1, the ninth diode D110, the first switch Q11, the second capacitor C2, and the sixth switching element Q6. At this time, a current flows through a total of four elements, i.e., the third and sixth switching elements Q3 and Q6, the first switch Q11, and the ninth diode D110 of the semiconductor elements (the switching elements, the switches, and the diodes).

Therefore, the potential of the first output point 103 is lower than the potential of the second output point 104 by the sum of the voltage (E/4[V]) across the first capacitor C1 and the voltage (E/4[V]) across the second capacitor C2. Thus, the output voltage of the power-converting device 10 generated between the first output point 103 and the second output point 104 is −E/2 (=−E/4−E/4)[V]. In this case, the potential of the third output point 105 is a potential obtained by adding the voltage across the inductor L1 to the potential of the first output point 103, and the potential of the fourth output point 106 is a potential obtained by subtracting the voltage across the inductor L2 from the potential of the second output point 104.

Figure 5A:
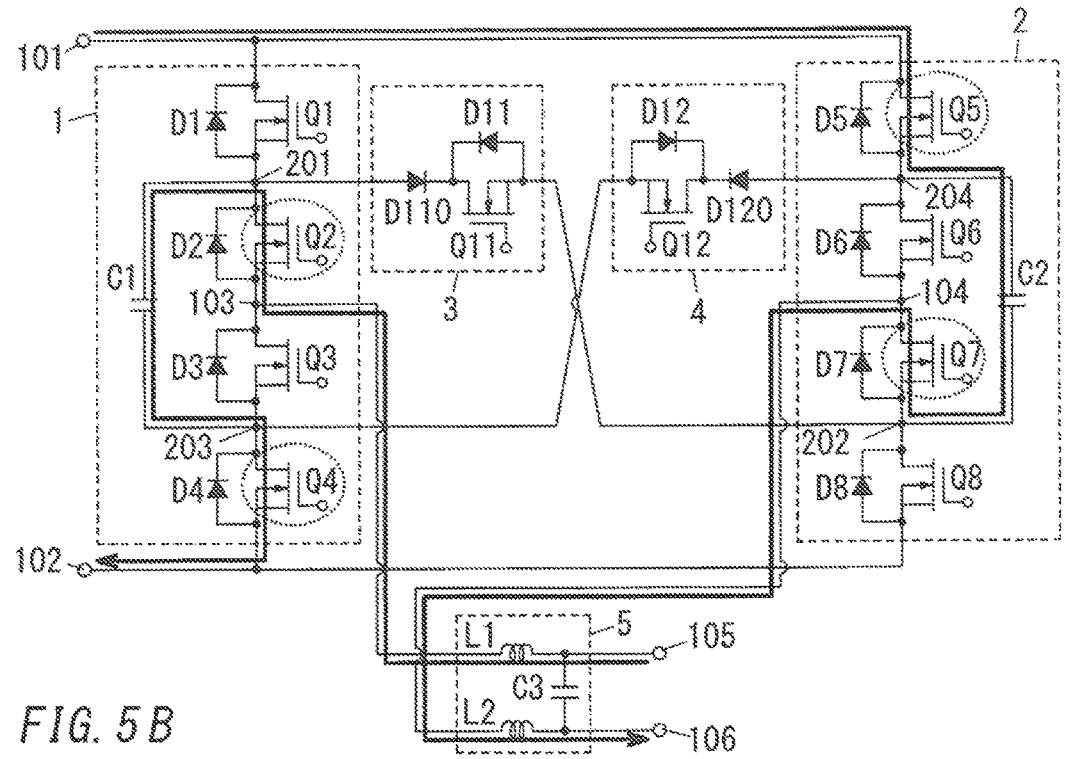
FIG. 5A is a view illustrating a seventh mode of the power-converting device according to the first embodiment.

Next, in the seventh mode illustrated in FIG. 5A, the second and fourth switching elements Q2 and Q4 of the first conversion circuit 1 and the fifth and seventh switching elements Q5 and Q7 of the second conversion circuit 2 are in the on state symmetrically with respect to the second mode. In this state, as illustrated in FIG. 5A, the first input point 101 is electrically connected to the second output point 104 via the fifth switching element Q5, the second capacitor C2, and the seventh switching element Q7. The second input point 102 is electrically connected to the first output point 103 via the fourth switching element Q4, the first capacitor C1, and the second switching element Q2. At this time, a current flows through a total of four elements, i.e., the second, fourth, fifth, and seventh switching elements Q2, Q4, Q5, and Q7 of the semiconductor elements (the switching elements, the switches, and the diodes).

Therefore, the potential of the first output point 103 is higher than the potential (0[V]) of the second input point 102 by the voltage (E/4[V]) across the first capacitor C1, that is, the potential of the first output point 103 is E/4 (=0+E/4)[V]. The potential of the second output point 104 is lower than the potential (E[V]) of the first input point 101 by the voltage (E/4[V]) across the second capacitor C2, that is, the potential of the second output point 104 is 3E/4 (=E−E/4)[V]. Thus, the output voltage of the power-converting device 10 generated between the first output point 103 and the second output point 104 is −E/2 (=E/4−3E/4)[V]. In this case, the potential of the third output point 105 is a potential obtained by adding the voltage across the inductor L1 to the potential of the first output point 103, and the potential of the fourth output point 106 is a potential obtained by subtracting the voltage across the inductor L2 from the potential of the second output point 104.

Figure 5B:
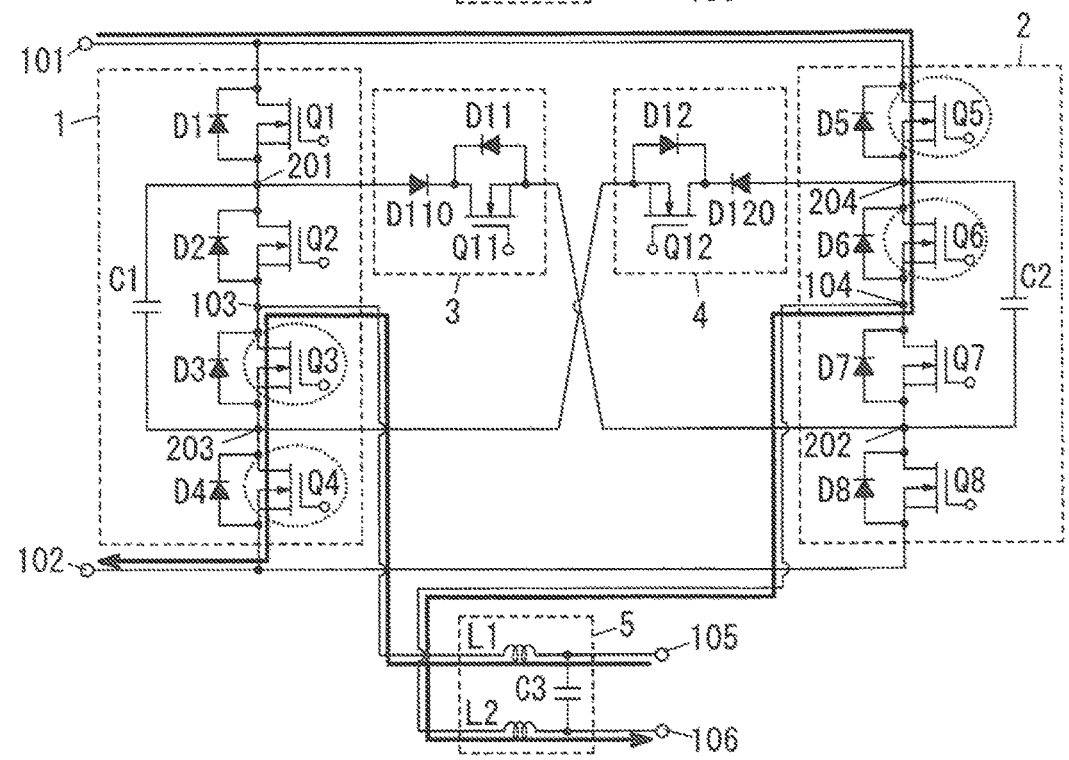
FIG. 5B is a view illustrating an eighth mode of the power-converting device according to the first embodiment.

Next, in the eighth mode illustrated in FIG. 5B, the third and fourth switching elements Q3 and Q4 of the first conversion circuit 1 and the fifth and sixth switching elements Q5 and Q6 of the second conversion circuit 2 are in the on state symmetrically with respect to the first mode. In this state, as illustrated in FIG. 5B, the first input point 101 is electrically connected to the second output point 104 via the fifth switching element Q5 and the sixth switching element Q6. The second input point 102 is electrically connected to the first output point 103 via the fourth switching element Q4 and the third switching element Q3. At this time, a current flows through a total of four elements, i.e., the third, fourth, fifth, and sixth switching elements Q3, Q4, Q5, and Q6 of the semiconductor elements (the switching elements, the switches, and the diodes).

Therefore, the first output point 103 is equivalent in potential (0[V]) to the second input point 102, and the second output point 104 is equivalent in potential (E[V]) to the first input point 101. Thus, the output voltage of the power-converting device 10 generated between the first output point 103 and the second output point 104 is −E (=0−E)[V]. In this case, the potential of the third output point 105 is a potential obtained by adding the voltage across the inductor L1 to the potential of the first output point 103, and the potential of the fourth output point 106 is a potential obtained by subtracting the voltage across the inductor L2 from the potential of the second output point 104.

In summary, the power-converting device 10 switches between the first to eighth modes, thereby changing the level of the output voltage generated between the first output point 103 and the second output point 104 in a plurality of stages.

More specifically, the first conversion circuit 1 uses the first capacitor C1 as a flying capacitor to switch on/off the first to fourth switching elements Q1 to Q4 and the first and second switches Q11 and Q12, thereby switching the potential of the first output point 103. The first capacitor C1 is charged in the second and seventh modes and discharged in the third and sixth modes, but performing switching between the first to eighth modes at a relatively high frequency allows the voltage across the first capacitor C1 during the basic operation to be considered to be substantially constant (E/4 [V]).

The second conversion circuit 2 uses the second capacitor C2 as a flying capacitor to switch on/off the fifth to eighth switching elements Q5 to Q8 and the first and second switches Q11 and Q12, thereby switching the potential of the second output point 104. The second capacitor C2 is charged in the second and seventh modes and discharged in the third and sixth modes, but performing switching between the first to eighth modes at a relatively high frequency allows the voltage across the second capacitor C2 during the basic operation to be considered to be substantially constant (E/4 [V]).

Therefore, in the first to eighth modes, the power-converting device 10 outputs an output voltage such that the first output point 103 is a high potential side and the second output point 104 is a low potential side. The power-converting device 10 switches the output voltage generated between the first output point 103 and the second output point 104 in the first to fourth modes between three stages, i.e., E[V] (first mode), E/2[V] (second and third modes), and 0[V] (fourth mode). In the fifth to eighth modes, the power-converting device 10 switches the output voltage generated between the first output point 103 and the second output point 104 between three stages, i.e., 0[V] (fifth mode), −E/2[V] (sixth and seventh modes), and −E[V] (eighth mode).

Therefore, the power-converting device 10 switches the output voltage among a total of eight, i.e., the first to eighth modes, thereby switching the output voltage between five stages, i.e., E[V], E/2[V], 0[V], −E/2[V], and −E[V]. The power-converting device 10 accordingly switches the output voltage between these five stages, thereby generating an alternate current voltage (hereinafter referred to as a "final output voltage") between the third output point 105 and the fourth output point 106.

Figure 6:
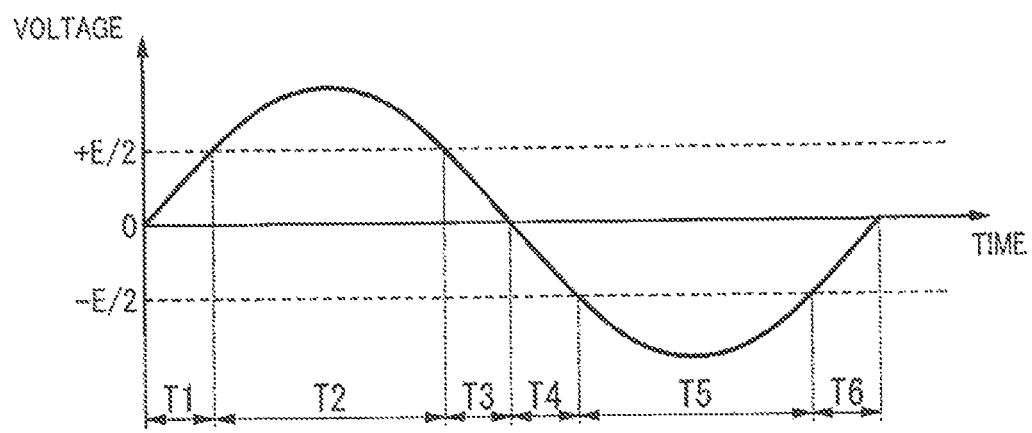
FIG. 6 is a waveform chart illustrating a final output voltage of the power-converting device according to the first embodiment.

Here, the final output voltage is equal to the output voltage of the system power supply 7 and has a sine wave form as illustrated in FIG. 6. In FIG. 6, the abscissa represents a time axis, and the ordinate represents voltage values. During time periods during which the final output voltage varies in the range of 0[V] to E[V] (that is, a time period corresponding to a half wave on a positive polarity side of the sine wave) T1 to T3, the power-converting device 10 switches between the first to fourth modes to switch the output voltage. During time periods during which the final output voltage varies in the range of 0[V] to E[V] (that is, a time period corresponding to a half wave on a negative polarity side of the sine wave) T4 to T6, the power-converting device 10 switches between the fifth to ninth modes to switch the output voltage.

The first to eighth modes described above can be summarized as illustrated in Table 1.

TABLE 1

| Period | | Output Voltage [V] | Mode | Q1, Q8 | Q2, Q7 | Q3, Q6 | Q4, Q5 | Q11 | Q12 |
|---|---|---|---|---|---|---|---|---|---|
| T2 | | +E | 1st | ON | ON | OFF | OFF | OFF | OFF |
| T1, | T3 | +E/2 | 2nd | ON | OFF | ON | OFF | OFF | OFF |
|  | T3 | +E/2 | 3rd | OFF | ON | OFF | OFF | OFF | ON |
|  |  | 0 | 4th | OFF | OFF | ON | OFF | OFF | ON |
|  | T4, | 0 | 5th | OFF | ON | OFF | OFF | ON | OFF |
| T5 | T6 | −E/2 | 6th | OFF | OFF | ON | OFF | ON | OFF |
|  |  | −E/2 | 7th | OFF | ON | OFF | ON | OFF | OFF |
|  |  | −E | 8th | OFF | OFF | ON | ON | OFF | OFF |

Here, the controller 6 switches on/off the first to eighth switching elements Q1 to Q8 and on/off the first and second switches Q11 and Q12 by Pulse Width Modulation (PWM) signals, thereby realizing the first to eighth modes.

More specifically, during the time periods T1 and T3 during which the final output voltage varies in the range of 0[V] to E/2[V] in FIG. 6, the controller 6 repeats operation of switching between the second to fourth modes as illustrated in Table 1. While repeating the operation, the controller 6 adjusts the time length of the second mode and the time length of the third mode, thereby keeping discharging and charging of the first capacitor C1 and the second capacitor C2 in balance.

During the time period T2 during which the final output voltage varies in the range of E/2[V] to E[V] in FIG. 6, the controller 6 repeats operation of switching between the first to third modes as illustrated in Table 1. While repeating the operation, the controller 6 adjusts the time length of the second mode and the time length of the third mode, thereby keeping discharging and charging of the first capacitor C1 and the second capacitor C2 in balance.

During the time periods T4 and T6 during which the final output voltage varies in the range of 0[V] to −E/2[V] in FIG. 6, the controller 6 repeats operation of switching between the fifth to seventh modes as illustrated in Table 1. While repeating the operation, the controller 6 adjusts the time length of the sixth mode and the time length of the seventh mode, thereby keeping discharging and charging of the first capacitor C1 and the second capacitor C2 in balance.

During the time periods T5 during which the final output voltage varies in the range of −E/2[V] to −E[V] in FIG. 6, the controller 6 repeats operation of switching between the sixth to eighth modes as illustrated in Table 1. While repeating the operation, the controller 6 adjusts the time length of the sixth mode and the time length of the seventh mode, thereby keeping discharging and charging of the first capacitor C1 and the second capacitor C2 in balance.

In the present embodiment, the controller 6 switches among the first to eighth modes described above while varying the duty ratio of the PWM signal to control the output voltage generated between the first output point 103 and the second output point 104 such that the wave form of the final output voltage is approximated to the sine wave. In summary, the power-converting device 10 accordingly switches the output voltage generated between the first output point 103 and the second output point 104 between five stages, thereby generating a sine wave-like alternate current voltage between the third output point 105 and the fourth output point 106.

Note that both the fourth mode and the fifth mode are modes in which the output voltage is 0[V] and does not contribute to discharging and charging of the first capacitor C1 and the second capacitor C2. Therefore, one of the fourth mode and the fifth mode may be omitted. However, when the positive-negative balance of the final output voltage is taken into consideration, separately providing the fourth mode and the fifth mode can decrease the switching loss and increase the efficiency of the power-converting device 10.

According to the power-converting device 10 of the present embodiment, the number of elements among the semiconductor elements (the switching elements, the switches, and the diodes) through which a current flows (hereinafter referred to as "the number of passed elements") is less than or equal to "4" in all of the first to eighth modes as described above.

In particular, in the third and fourth modes in which the second bidirectional switch 4 is in the on state, the number of passed elements is "4" even when the second switch Q12 and the tenth diode D120 are considered to be different elements. Similarly, in the fifth and sixth modes in which the first bidirectional switch 3 is in the on state, the number of passed elements is "4" even when the first switch Q11 and the ninth diode D110 are considered to be different elements. Therefore, when the first and second bidirectional switches 3 and 4 are each one element, the number of passed elements in the third to sixth modes is "3."

<Configuration of Power Conditioner>

Figure 7:
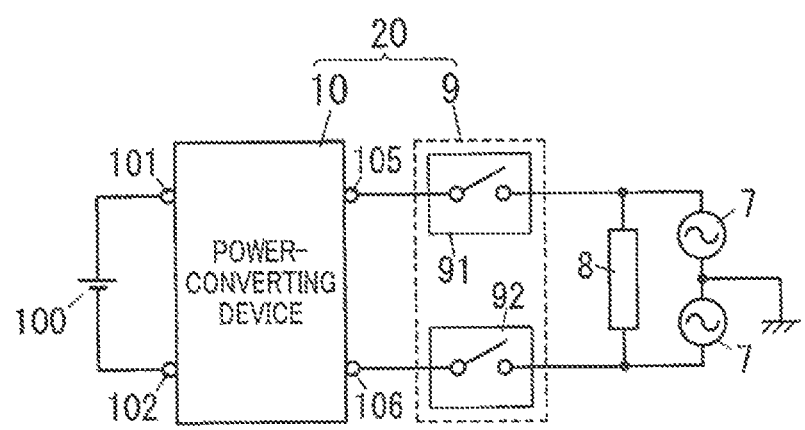
FIG. 7 is a view schematically illustrating the configuration of a power conditioner according to the first embodiment.

As illustrated in FIG. 7, the power conditioner 20 according to the present embodiment includes the power-converting device 10 and a disconnection device 9. The disconnection device 9 is electrically connected between each of the first output point 103 (see FIG. 1) and the second output point 104 (see FIG. 1) and each of the system power supplies 7. In the example shown in FIG. 7, the disconnection device 9 is electrically connected between each of the third output point 105 and the fourth output point 106 and each of the system power supplies 7. In other words, the disconnection device 9 is connected to the first output point 103 and the second output point 104 via the filter circuit 5 (see FIG. 1).

The disconnection device 9 includes a first contact point 91 electrically connected between the third output point 105 and one of the system power supplies 7 and a second contact point 92 electrically connected between the fourth output point 106 and the other one of the system power supplies 7. Note that the disconnection device 9 may be electrically connected between at least one of the third output point 105 and the fourth output point 106 and the system power supply 7, and one of the first contact point 91 and the second contact point 92 may be omitted.

The power conditioner 20 performs grid-connected operation in a regular state to convert direct current power input from the direct current power supply 100 into alternate current power in the power-converting device 10, thereby outputting the alternate current power to the system power supplies 7 and the load 8. Although detailed description is omitted, the power conditioner 20 is configured to open the disconnection device 9 in an abnormal state such as a power outage of the system power supply 7 so as to perform autonomous operation of outputting the alternate current power while being disconnected (paralleled off) from the system power supplies 7.

According to the power conditioner 20, opening (disconnecting) the disconnection device 9 can electrically separate the first conversion circuit 1 and the second conversion circuit 2 from the system power supplies 7. Thus, the power conditioner 20 opens the disconnection device 9 during the start time period after power supply and before a start of the above-described basic operation by the power-converting device 10, thereby forming a current path including the filter circuit 5 between the first output point 103 and the second output point 104.

The current path here is a current path including the inductor L1, the third capacitor C3, and the inductor L2 of the filter circuit 5. The power-converting device 10 uses the current path as a charging path to allow the first capacitor C1 and the second capacitor C2 to be charged even when the third output point 105 is electrically isolated from the fourth output point 106.

Therefore, the power-converting device 10 allows the first capacitor C1 and the second capacitor C2 to be charged even without the third output point 105 and the fourth output point 106 being connected to the system power supplies 7. In other words, the power-converting device 10 allows capacitors (the first capacitor C1 and the second capacitor C2) required for regular operation to be charged even when no load is connected between output terminals in a pair (the third output point 105 and the fourth output point 106) (in a non-load state). Note that the regular operation here refers to operation of the power-converting device 10 after a start time period has elapsed, that is, after charging the first capacitor C1 and the second capacitor C2 to the reference voltage (E/4[V]), and the regular operation here is synonymous with the above-described basic operation.

<Effects>

According to the present embodiment described above, the power-converting device 10 includes the first conversion circuit 1 and the second conversion circuit 2 connected in parallel with each other between both ends of the direct current power supply 100, wherein the first conversion circuit 1 is connected to the second conversion circuit 2 via the first bidirectional switch 3 and the second bidirectional switch 4. Here, the first conversion circuit 1 includes four switching elements (the first to fourth switching elements Q1 to Q4) and one capacitor (the first capacitor C1). Similarly, the second conversion circuit 2 includes four switching elements (the fifth to eighth switching elements Q5 to Q8) and one capacitor (the second capacitor C2).

With this configuration, a current input from the direct current power supply 100 to the power-converting device 10 passes through at most only four of the ten switching elements (the first to eighth switching elements Q1 to Q8 and the first and second bidirectional switches 3 and 4). Therefore, the power-converting device 10 has advantages such as a relatively small sum of conduction losses of the switching elements and further improved power conversion efficiency.

The power-converting device 10 generally requires a large-size heat radiator (air-cooling device such as a heat sink and a fan) since an increase in conduction loss generally increases heat generation amount. However, in the power-converting device 10 of the present embodiment, the conduction loss is reduced, and therefore, downsizing of the heat radiator can also be expected.

When compared with the configuration described in Document 1, the power-converting device 10 of the present embodiment requires no voltage-dividing capacitor, and thus, the entire size of the power-converting device 10 can be reduced by the size of the voltage-dividing capacitor. That is, since the power-converting device described in Document 1 applies a direct-current voltage E to a series circuit of two direct current capacitors to divide the direct-current voltage E into voltages E/2, the two direct current capacitors are indispensable elements in Document 1. In contrast, the power-converting device 10 of the present embodiment requires no voltage-dividing capacitor, and thus, the entire size of the device can be reduced by the size of the voltage-dividing capacitor.

As described in the present embodiment, the power-converting device 10 preferably includes the controller 6 whose control targets are the first to fourth switching elements Q1 to Q4, the fifth to eighth switching elements Q5 to Q8, the first bidirectional switch 3, and the second bidirectional switch 4. In this case, the controller 6 controls the control targets to generate an output voltage between the first output point 103 and the second output point 104. With this configuration, the power-converting device 10 is capable of outputting an output voltage by controlling the control targets (the first to eighth switching elements Q1 to Q8 and the first and second bidirectional switches 3 and 4) by the controller 6.

In this case, as described in the present embodiment, the reference voltage is preferably ¼ of the voltage applied between the first input point 101 and the second input point 102 from the direct current power supply 100. In this case, the controller 6 controls the control targets (the first to eighth switching elements Q1 to Q8 and the first and second bidirectional switches 3 and 4) such that the first capacitor C1 and the second capacitor C2 each repeat charging and discharging with the reference voltage as a center. That is, the first capacitor C1 and the second capacitor C2 each repeat charging and discharging such that the voltage of each of the first capacitor C1 and the second capacitor C2 varies within a predetermined range centering the reference voltage.

With this configuration, the power-converting device 10 is capable of switching the output voltage generated between the first output point 103 and the second output point 104 between three stages, i.e., E[V], E/2[V], and 0[V] as described above in the first to fourth modes. In the fifth to eighth modes, the power-converting device 10 switches the output voltage generated between the first output point 103 and the second output point 104 between three stages, i.e., 0[V], −E/2[V], and −E[V]. As a result, the power-converting device 10 is capable of switching the output voltage between five stages, i.e., E[V], E/2[V], 0[V], −E/2[V], −E[V] by switching between the first to eighth modes.

In summary, while the power-converting device 10 according to the present embodiment is a five-level inverter configured to switch the output voltage between five stages, the power-converting device 10 operates in a similar manner as a three-level inverter, and therefore, the number of passed elements may be less than or equal to "4" which is the same number of passed elements of the three-level inverter. Therefore, the number of passed elements in the power-converting device 10 may be less than the number of passed elements of a general five-level inverter, which is "6." This allows the power conversion efficiency of the power-converting device 10 to be further improved.

As described in the present embodiment, the controller 6 preferably controls the control targets (the first to eighth switching elements Q1 to Q8 and the first and second bidirectional switches 3 and 4) to vary the magnitude of the output voltage between the five stages. With this configuration, the power-converting device 10 is capable of more finely adjusting the voltage value of the output voltage than a so-called two-level inverter configured to switch the output voltage between only two stages.

As described in the present embodiment, the output voltage is preferably an alternate current voltage. With this configuration, the power-converting device 10 is capable of converting the direct-current voltage output from the direct current power supply 100 into an alternate current voltage and outputting the alternate current voltage, and therefore, the power-converting device 10 may be available, for example, as a grid connection connected to the system power supply 7.

As described in the present embodiment, the power-converting device 10 preferably further includes the filter circuit 5 electrically connected between the first output point 103 and the second output point 104 to form a current path between the first output point 103 and the second output point 104. With this configuration, a harmonic component can be removed from the output voltage by the filter circuit 5. Moreover, the first capacitor C1 and the second capacitor C2 is chargeable through the filter circuit 5 even without the loads (the system power supply 7 and the load 8) being connected between the first output point 103 and the second output point 104. Note that the filter circuit 5 is not an essential element of the power-converting device 10 but may be accordingly omitted.

According to the power conditioner 20 of the present embodiment, opening (disconnecting) the disconnection device 9 allows the first conversion circuit 1 and the second conversion circuit 2 to be electrically separated from the system power supplies 7. Therefore, the power conditioner 20 performs grid-connected operation in a regular state and opens the disconnection device 9 in an abnormal state such as a power outage of the system power supply 7 to enable autonomous operation of outputting the alternate current power while being disconnected from the system power supply 7.

(Second Embodiment)

Figure 8:
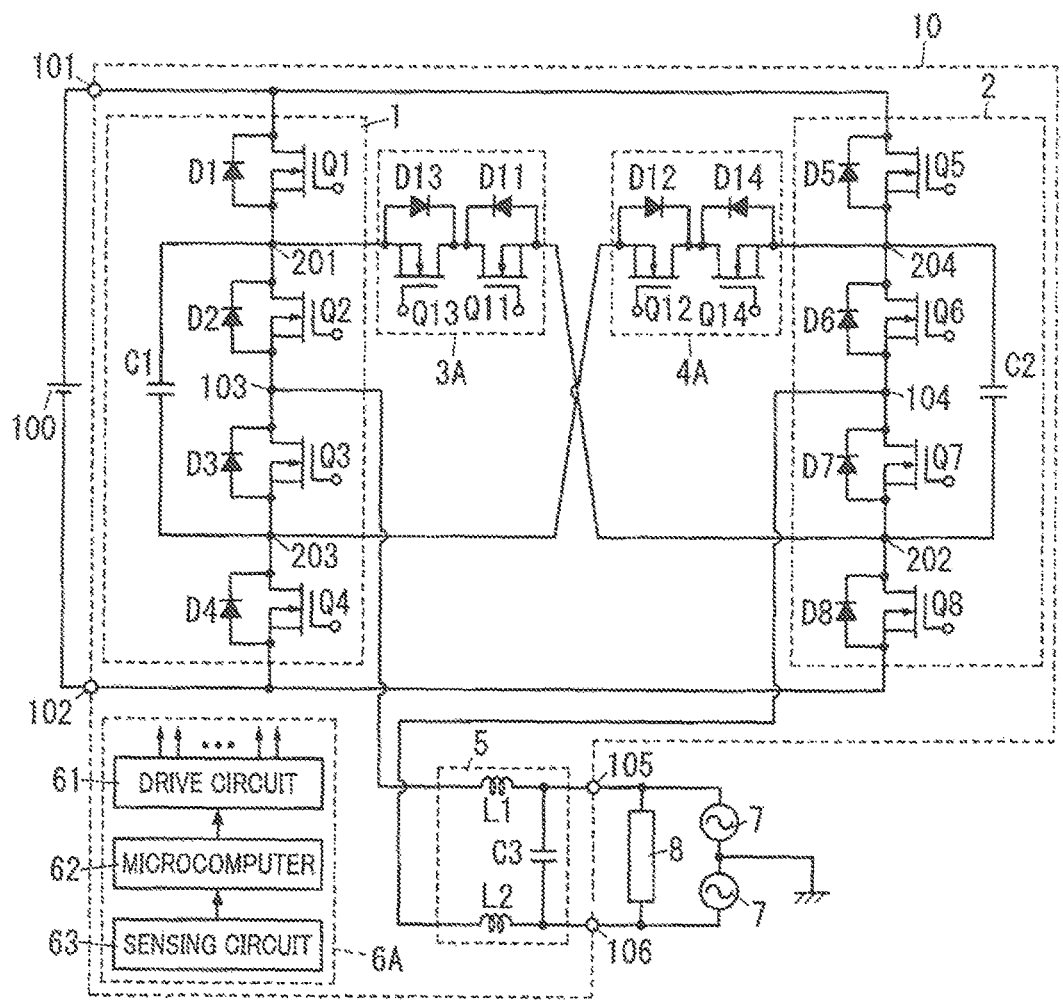
FIG. 8 is a circuit diagram illustrating the configuration of a power-converting device according to a second embodiment.

As illustrated in FIG. 8, configurations of a first bidirectional switch 3A and a second bidirectional switch 4A of a power-converting device 10 of the present embodiment are different from those of the first bidirectional switch 3 and the second bidirectional switch 4 of the first embodiment. In the present embodiment, a controller 6A includes a drive circuit 61 configured to input a drive signal to first to eighth switching elements Q1 to Q8, and other elements, a microcomputer 62 configured to input a PWM signal to the drive circuit 61, and a sensing circuit 63, which will be described later. The same components as those in the first embodiment are hereinafter denoted by the same reference symbols and the description thereof will be omitted.

In the present embodiment, the first bidirectional switch 3A is configured to be capable of switching between operational states including a fully off state and a fully on state. The fully off state of the first bidirectional switch 3A is a state in which a bidirectional flow of a current between a first connection point 201 and a second connection point 202 is shut off. The fully on state of the first bidirectional switch 3A is a state in which a current is allowed to pass bidirectionally between the first connection point 201 and the second connection point 202. The second bidirectional switch 4A is also configured to be capable of switching between operational states including a fully off state and a fully on state. The fully off state of the second bidirectional switch 4A is a state in which a bidirectional flow of a current between a third connection point 203 and a fourth connection point 204 is shut off. The fully on state of the second bidirectional switch 4A is a state in which a current is allowed to pass bidirectionally between the third connection point 203 and the fourth connection point 204.

Moreover, in the present embodiment, the operational states of the first bidirectional switch 3A further include a half-on state in which a current flowing from the second connection point 202 toward the first connection point 201 is shut off and a current flowing from the first connection point 201 toward the second connection point 202 is allowed to pass. The operational states of the second bidirectional switch 4A further include a half-on state in which a current flowing from the third connection point 203 toward the fourth connection point 204 is shut off and a current flowing from the fourth connection point 204 toward the third connection point 203 is allowed to pass.

That is, as described in the first embodiment, the direction of a current which flows in an on state of the first bidirectional switch 3 including the first switch Q11 and a diode (the ninth diode D110) is limited to one direction, and therefore, the fully on state cannot be selected. Similarly, the direction of a current which flows in the on state in the second bidirectional switch 4 including the second switch Q12 and a diode (the tenth diode D120) is limited to one direction, and therefore, the fully on state cannot be selected.

In summary, the bidirectional switch in the first embodiment (each of the first bidirectional switch 3 and the second bidirectional switch 4) is capable of switching between two operational states, i.e., the fully off state in which a bidirectional flow of a current is shut off and the half-on state in which a current is allowed to pass in one direction. In contrast, the bidirectional switch (each of the first bidirectional switch 3A and the second bidirectional switch 4A) of the present embodiment is capable of switching between three operational states including a fully on state in addition to a fully off state and a half-on state.

Therefore, in the power-converting device 10 of the present embodiment, the first bidirectional switch 3A is brought into the fully on state, thereby creating a state in which a current is allowed to pass bidirectionally between the first connection point 201 and the second connection point 202. In the power-converting device 10 of the present embodiment, the second bidirectional switch 4A is brought into the fully on state, thereby creating a state in which a current is allowed to pass bidirectionally between the third connection point 203 and the fourth connection point 204.

<Configuration of Power-Converting Device>

The specific configuration of the power-converting device 10 of the present embodiment will be described below with reference to FIG. 8.

According to the present embodiment, the first bidirectional switch 3A includes a third switch Q13 and a first switch Q11 electrically connected in series with each other between the first connection point 201 and the second connection point 202. That is, the first bidirectional switch 3A includes the third switch Q13 in place of the ninth diode D110 of the first embodiment, and the third switch Q13 and the first switch Q11 are connected in this order from the first connection point 201.

Specifically, the third switch Q13 is a depletion type n-channel MOSFET as in the case of the first switch Q11. The source of the third switch Q13 is connected to the first connection point 201, and the drain of the third switch Q13 is connected to the drain of the first switch Q11. In summary, the first switch Q11 and the third switch Q13 are connected in anti-series between the first connection point 201 and the second connection point 202 with their drains being connected to each other.

The second bidirectional switch 4A includes a second switch Q12 and a fourth switch Q14 electrically connected in series with each other between the third connection point 203 and the fourth connection point 204. That is, the second bidirectional switch 4A includes the fourth switch Q14 in place of the tenth diode D120 of the first embodiment, and the second switch Q12 and the fourth switch Q14 are connected in this order from the third connection point 203.

Specifically, the fourth switch Q14 is a depletion type n-channel MOSFET as in the case of the second switch Q12. The source of the fourth switch Q14 is connected to the fourth connection point 204, and the drain of the fourth switch Q14 is connected to the drain of the second switch Q12. In summary, the second switch Q12 and the fourth switch Q14 are connected in anti-series between the third connection point 203 and the fourth connection point 204 with their drains being connected to each other.

Thirteenth and fourteenth diodes D13 and D14 which are parasitic diodes are further connected in anti-parallel with the third switch Q13 and the fourth switch Q14, respectively. The thirteenth diode D13 is connected with its cathode and anode respectively facing the drain and the source of the third switch Q13. The fourteenth diode D14 is connected with its cathode and anode respectively facing the drain and the source of the fourth switch Q14.

With this configuration, the bidirectional switch (each of the first bidirectional switch 3A and the second bidirectional switch 4A) in the present embodiment is capable of switching between three operational states including a fully on state in addition to the fully off state and the half-on state.

That is, the first bidirectional switch 3A is in the fully off state when both of the first and third switches Q11 and Q13 are in the off state, and the first bidirectional switch 3A is in the fully on state when both of the first and third switches Q11 and Q13 are in the on state. The first bidirectional switch 3A is in a half-on state in which the direction of a current is limited by the thirteenth diode D13 to one direction when the first switch Q11 is in the on state and the third switch Q13 is in the off state. The second bidirectional switch 4A is in the fully off state when both of the second and fourth switches Q12 and Q14 are in the off state, and the second bidirectional switch 4A is in the fully on state when both of the second and fourth switches Q12 and Q14 are in the on state. The second bidirectional switch 4A is in the half-on state in which the direction of a current is limited by the fourteenth diode D14 to one direction when the second switch Q12 is in the on state and the fourth switch Q14 is in the off state.

The third and fourth switches Q13 and Q14 each have a gate electrically connected to the controller 6A. The controller 6A is capable of individually switching on/off the first and second switches Q11 and Q12 to control the first bidirectional switch 3A. The controller 6A is also capable of individually switching on/off the third and fourth switches Q13 and Q14 to control the second bidirectional switch 4A.

In the present embodiment, the controller 6A includes the drive circuit 61, the microcomputer 62, and the sensing circuit 63.

The drive circuit 61 is configured to input drive signals to the first to eighth switching elements Q1 to Q8 and control terminals (gates) of the first to fourth switches Q11 to Q14, thereby individually driving (controlling) the elements. The microcomputer 62 is configured to input a PWM signal to the drive circuit 61 to control the drive circuit 61. That is, the controller 6A individually controls the first to eighth switching elements Q1 to Q8 and the first to fourth switches Q11 to Q14 by the drive signals generated by the drive circuit 61 in response to instructions from the microcomputer 62.

The sensing circuit 63 is configured to sense the magnitude of the voltage across a first capacitor C1 and the magnitude of the voltage across a second capacitor C2. Operation of the controller 6A based on the sensing result of the sensing circuit 63 will be described later.

Here, the drive circuit 61 preferably also serves as a short circuit preventing circuit configured to prevent a flow of a short-circuit current due to simultaneous turning on of two or more semiconductor elements (switching elements, switches, diodes). That is, when semiconductor elements in a specific combination are simultaneously turned on, for example, a first input point 101 and a second input point 102 are short-circuited to each other, and a current from a direct current power supply 100 may flow to the semiconductor element as a short-circuit current. The drive circuit 61 is thus preferably configured to prevent semiconductor elements in such a specific combination from being simultaneously turned on. For example, the drive circuit 61 is configured such that when drive signals input to control terminals (gates) of semiconductor elements in a specific combination simultaneously reach an H level, the levels of the drive signals are forcibly lowered to an L level so as to prevent the semiconductor elements in the specific combination from being simultaneously turned on.

Examples of the specific combination for which the drive circuit 61 preferably prevents simultaneous turning on of the semiconductor elements are listed below.

(1) "First Switching Element Q1, Fourth Switching Element Q4"

When the first switching element Q1 and the fourth switching element Q4 are simultaneously turned on, the first capacitor C1 is electrically connected to the direct current power supply 100. This state causes an arm short circuit short-circuiting the first input point 101 and the second input point 102 to each other via one arm (the first conversion circuit 1). Therefore, a short-circuit current (large current) may flow from the direct current power supply 100 to the first conversion circuit 1.

(2) "Fifth Switching Element Q5, Eighth Switching Element Q8"

When the fifth switching element Q5 and the eighth switching element Q8 are simultaneously turned on, the second capacitor C2 is electrically connected to the direct current power supply 100. This state causes an arm short circuit short-circuiting the first input point 101 and the second input point 102 to each other via the other arm (the second conversion circuit 2). Therefore, a short-circuit current (large current) may flow from the direct current power supply 100 to the second conversion circuit 2.

(3) "Second Switching Element Q2, Third Switching Element Q3"

When the second switching element Q2 and the third switching element Q3 are simultaneously turned on, both ends of the first capacitor C1 are electrically connected to each other. In this state, the both ends of the first capacitor C1 are short-circuited to each other, and therefore, a short-circuit current (large current) may flow from the first capacitor C1 to the second switching element Q2 and the third switching element Q3.

(4) "Sixth Switching Element Q6, Seventh Switching Element Q7"

When the sixth switching element Q6 and the seventh switching element Q7 are simultaneously turned on, both ends of the second capacitor C2 are electrically connected to each other. In this state, the both ends of the second capacitor C2 are short-circuited to each other, and therefore, a short-circuit current (large current) may flow from the second capacitor C2 to the sixth switching element Q6 and the seventh switching element Q7.

(5) "First Switching Element Q1, First Switch Q11"

When the first switching element Q1 and the first switch Q11 are simultaneously turned on, the both ends of the second capacitor C2 are electrically connected to each other via a fifth diode D5 and the thirteenth diode D13. In this state, the both ends of the second capacitor C2 are short-circuited to each other, and therefore, a short-circuit current (large current) may flow from the second capacitor C2 to the first switching element Q1 and the first switch Q11.

(6) "Fifth Switching Element Q5, Second Switch Q12"

When the fifth switching element Q5 and the second switch Q12 are simultaneously turned on, the both ends of the first capacitor C1 are electrically connected to each other via the first diode D1 and the fourteenth diode D14. In this state, the both ends of the first capacitor C1 are short-circuited to each other, and therefore, a short-circuit current (large current) may flow from the first capacitor C1 to the fifth switching element Q5 and the second switch Q12.

(7) "Fourth Switching Element Q4, Second Switch Q12"

When the fourth switching element Q4 and the second switch Q12 are simultaneously turned on, the both ends of the second capacitor C2 are electrically connected to each other via the fourteenth diode D14 and an eighth diode D8. In this state, the both ends of the second capacitor C2 are short-circuited to each other, and therefore, a short-circuit current (large current) may flow from the second capacitor C2 to the second switch Q12 and the fourth switching element Q4.

(8) "Eighth Switching Element Q8, First Switch Q11"

When the eighth switching element Q8 and the first switch Q11 are simultaneously turned on, the both ends of the first capacitor C1 are electrically connected to each other via the thirteenth diode D13 and a fourth diode D4. In this state, the both ends of the first capacitor C1 are short-circuited to each other, and therefore, a short-circuit current (large current) may flow from the first capacitor C1 to the first switch Q11 and the eighth switching element Q8.

(9) "First Switching Element Q1, First Switch Q11, Eighth Switching Element Q8"

When the first switching element Q1, the first switch Q11, and the eighth switching element Q8 are simultaneously turned on, the first input point 101 and the second input point 102 are electrically connected to each other via the thirteenth diode D13. In this state, the first input point 101 and the second input point 102 are short-circuited to each other, and therefore, a short-circuit current (large current) may flow from the direct current power supply 100 to the first switching element Q1, the first switch Q11, and the eighth switching element Q8.

(10) "Fifth Switching Element Q5, Second Switch Q12, Fourth Switching Element Q4"

When the fifth switching element Q5, the second switch Q12, and the fourth switching element Q4 are simultaneously turned on, the first input point 101 and the second input point 102 are electrically connected to each other via the fourteenth diode D14. In this state, the first input point 101 and the second input point 102 are short-circuited to each other, and therefore, a short-circuit current (large current) may flow from the direct current power supply 100 to the fifth switching element Q5, second switch Q12, and the fourth switching element Q4.

(11) "First Switching Element Q1, Fourth Switch Q14, Eighth Switching Element Q8"

When the first switching element Q1, the fourth switch Q14, and the eighth switching element Q8 are simultaneously turned on, the first capacitor C1 and the second capacitor C2 are electrically connected to the direct current power supply 100 via a twelfth diode D12. In this state, the first input point 101 and the second input point 102 are short-circuited to each other, and therefore, a short-circuit current (large current) may flow from the direct current power supply 100 to the first switching element Q1, the fourth switch Q14, and the eighth switching element Q8.

(12) "Fifth Switching Element Q5, Third Switch Q13, Fourth Switching Element Q4"

When the fifth switching element Q5, the third switch Q13, and the fourth switching element Q4 are simultaneously turned on, the second capacitor C2 and the first capacitor C1 are electrically connected to the direct current power supply 100 via the eleventh diode D11. In this state, the first input point 101 and the second input point 102 are short-circuited to each other, and therefore, a short-circuit current (large current) may flow from the direct current power supply 100 to the fifth switching element Q5, the third switch Q13, and the fourth switching element Q4.

(13) "First Switch Q11, Second Switch Q12"

When the first switch Q11 and the second switch Q12 are simultaneously turned on, the first capacitor C1 is electrically connected to the second capacitor C2 via the thirteenth diode D13 and the fourteenth diode D14. In this state, the first capacitor C1 and the second capacitor C2 are short-circuited to each other, and therefore, a short-circuit current (large current) may flow from the first capacitor C1 and the second capacitor C2 to the first switch Q11 and the second switch Q12.

The combination (9) of the above-mentioned combinations (1) to (13) includes the combinations (5) and (8), and therefore, as long as the drive circuit 61 prevents the simultaneous turning on of the semiconductor elements in the combination (5) or (8), the drive circuit 61 does not need to prevent the simultaneous turning on of the semiconductor elements in the combination (9). Similarly, the combination (10) includes the combinations (6) and (7), and therefore, as long as the drive circuit 61 prevents the simultaneous turning on of the semiconductor elements in the combination (6) or (7), the drive circuit 61 does not need to prevent the simultaneous turning on of the semiconductor elements in the combination (10).

Since the combination (11) causes a problem only when all of the fifth switching element Q5, the third switch Q13, and the fourth switching element Q4 are simultaneously turned on, the drive circuit 61 may prevent two of the three elements from being simultaneously turned on. That is, when the drive circuit 61 prevents the simultaneous turning on of the first switching element Q1 and the fourth switch Q14 in combination or the simultaneous turning on of the eighth switching element Q8 and the fourth switch Q14 in combination, the simultaneous turning on of the semiconductor elements in the combination (11) can be prevented. Similarly, regarding the combination (12), the drive circuit 61 may prevent two of the fifth switching element Q5, the third switch Q13, and the fourth switching element Q4 from being simultaneously turned on. That is, when the drive circuit 61 prevents the simultaneous turning on of the fifth switching element Q5 and the third switch Q13 in combination or the fourth switching element Q4 and the third switch Q13 in combination, the simultaneous turning on of the semiconductor elements in the combination (11) can be prevented.

Moreover, to prevent the semiconductor elements in the above-described specific combinations from being simultaneously turned on, the controller 6A preferably has an upper limit and a lower limit set for the duty ratio of the PWM signal at the time of switching between the first to eighth modes. With this configuration, the controller 6A may have dead time set at the time of switching between the first to eighth modes, which allows more reliable prevention of simultaneous turning on of the semiconductor elements in the above-described specific combinations.

<Basic Operation of Power-Converting Device>

Basic operation of the power-converting device 10 of the present embodiment will be briefly described with reference to FIGS. 9A, 9B, 10A, 10B, 11A, 11B, 12A, and 12B. In the figures, the bold arrows represent current paths, and switching elements (or switches) circled by a dotted line represent elements through which a current passes.

Operation different from the basic operating described in the first embodiment will be mainly described below. In the following description, the first to eighth switching elements Q1 to Q8 and the first to fourth switches Q11 to Q14 are in the "off" state unless otherwise stated as to their on/off states. It is also assumed that voltage drops across the first to eighth switching elements Q1 to Q8 and the first to fourth switches Q11 to Q14 are negligible.

Figure 9A:
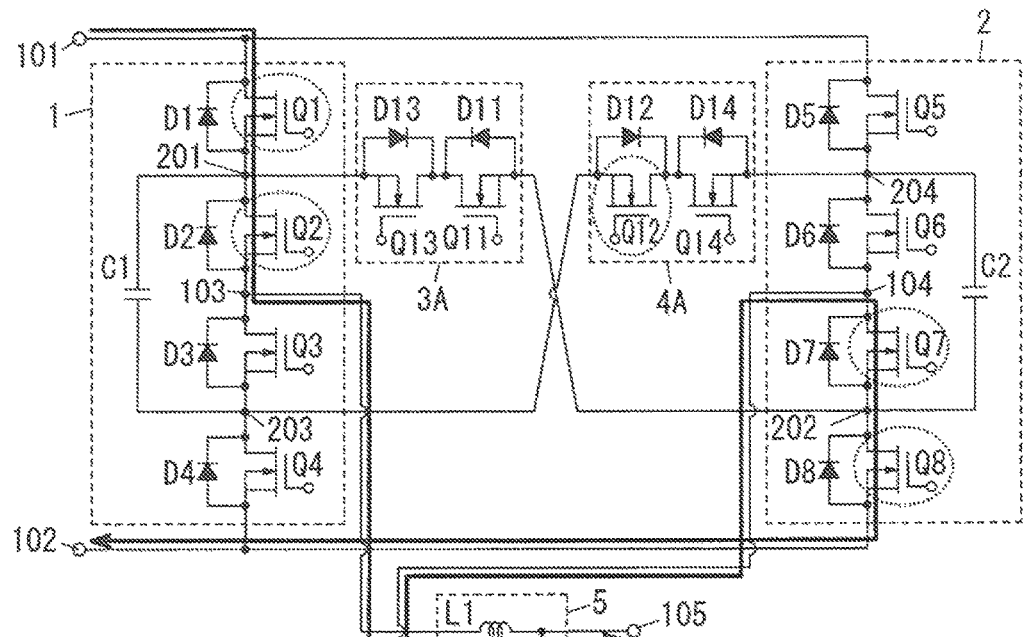
FIG. 9A is a view illustrating a first mode of the power-converting device according to the second embodiment.

First, in a first mode illustrated in FIG. 9A, the second switch Q12 of the second bidirectional switch 4A as well as the first and second switching elements Q1 and Q2 and the seventh and eighth switching elements Q7 and Q8 is in the on state. That is, the second bidirectional switch 4A is in the half-on state. Note that in this state, a path through which a current flows is the same as that in the first mode of the first embodiment, and no current flows through the second switch Q12.

Figure 9B:
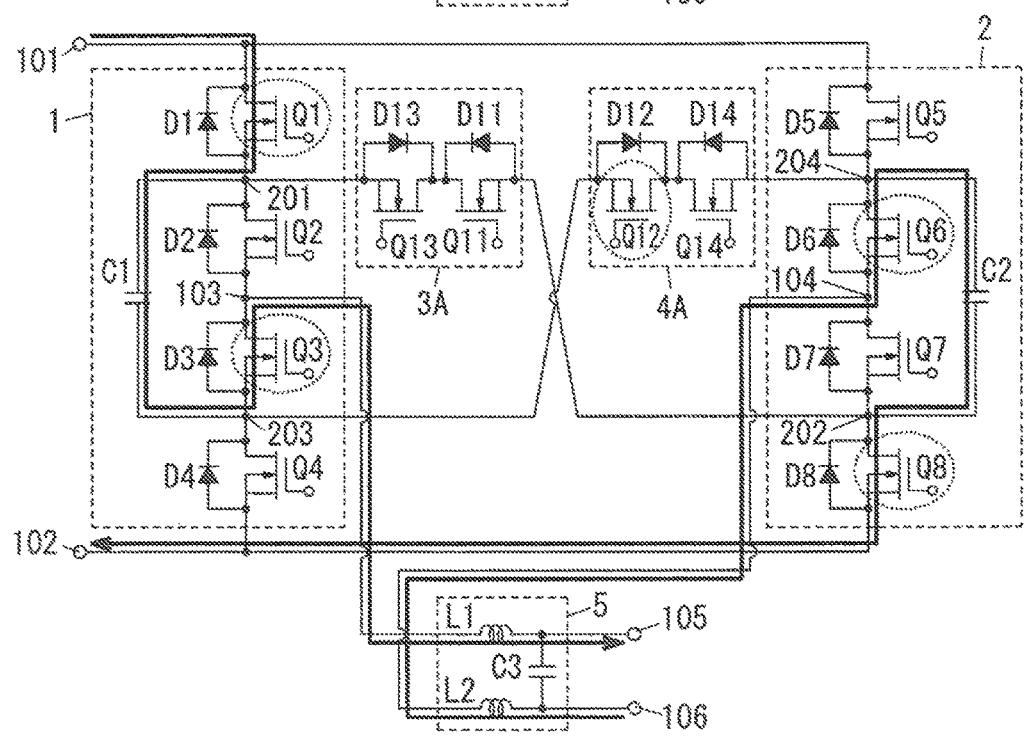
FIG. 9B is a view illustrating the second mode of the power-converting device according to the first embodiment.

Next, in a second mode illustrated in FIG. 9B, the second switch Q12 of the second bidirectional switch 4A as well as the first and third switching elements Q1 and Q3 and the sixth and eighth switching elements Q6 and Q8 is in the on state. That is, the second bidirectional switch 4A is in the half-on state. Note that in this state, a path through which a current flows is the same as that of the second mode of the first embodiment, and no current flows through the second switch Q12.

Figure 10A:
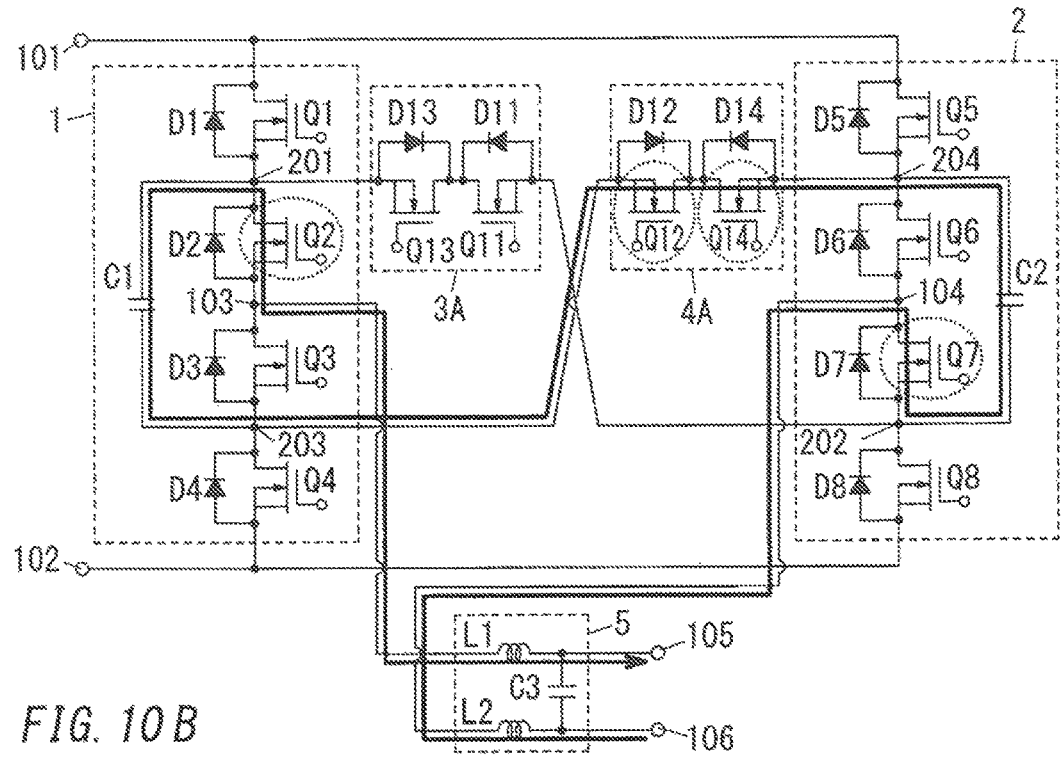
FIG. 10A is a view illustrating a third mode of the power-converting device according to the second embodiment.

Next, in a third mode illustrated in FIG. 10A, the fourth switch Q14 as well as the second switching element Q2, the seventh switching element Q7, and the second switch Q12 of the second bidirectional switch 4A is in the on state. That is, the second bidirectional switch 4A is in the fully on state. In this state, the current path is the same as that of the third mode of the first embodiment, but since the second bidirectional switch 4A is in the fully on state, the power-converting device 10 allows a bidirectional flow of a current between the first output point 103 and the second output point 104.

Figure 10B:
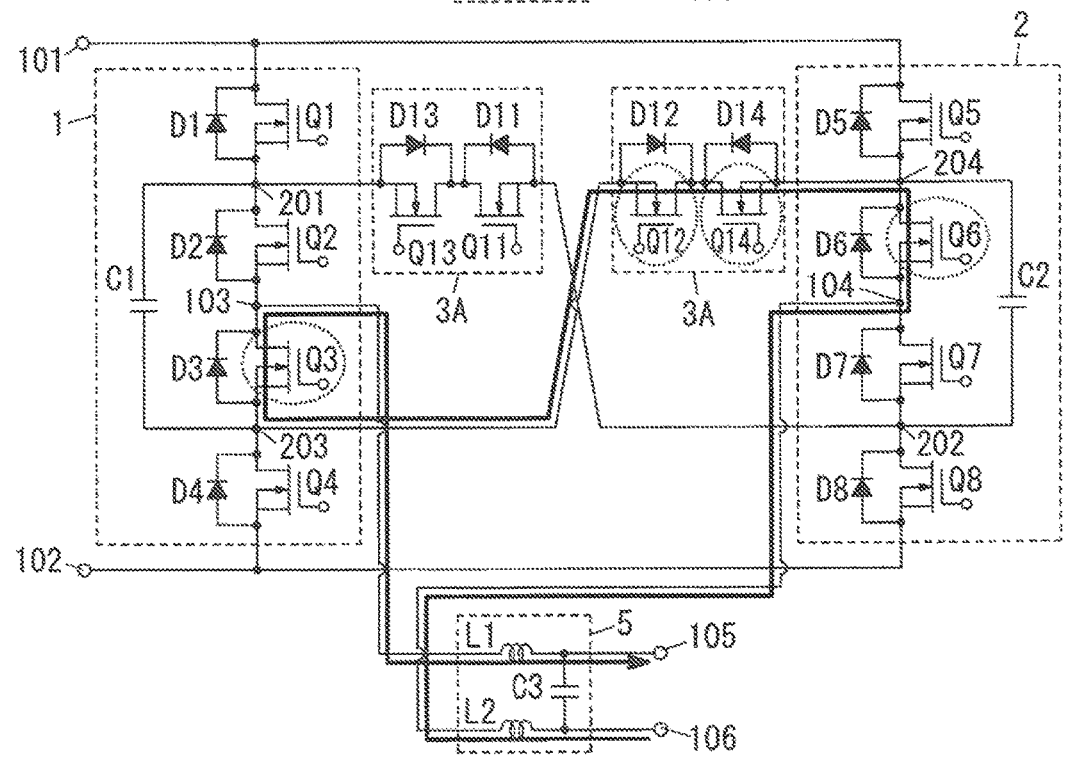
FIG. 10B is a view illustrating the fourth mode of the power-converting device according to the first embodiment.

Next, in a fourth mode illustrated in FIG. 10B, the fourth switch Q14 as well as the third switching element Q3, the sixth switching element Q6, and the second switch Q12 of the second bidirectional switch 4A is in the on state. That is, the second bidirectional switch 4A is in the fully on state. In this state, the current path is the same as that of the fourth mode of the first embodiment, but since the second bidirectional switch 4A is in the fully on state, the power-converting device 10 allows a bidirectional flow of a current between the first output point 103 and the second output point 104.

In fifth to eighth modes, the power-converting device 10 operates based on the first to fourth modes with operation of the first conversion circuit 1 and operation of the second conversion circuit 2 being interchanged and operation of the first bidirectional switch 3A and operation of the second bidirectional switch 4A being interchanged. That is, the operation of the first conversion circuit 1 and the first bidirectional switch 3A and the operation of the second conversion circuit 2 and the second bidirectional switch 4A in the fifth to eighth modes are symmetrical with respect to those in the first to fourth modes.

Figure 11A:
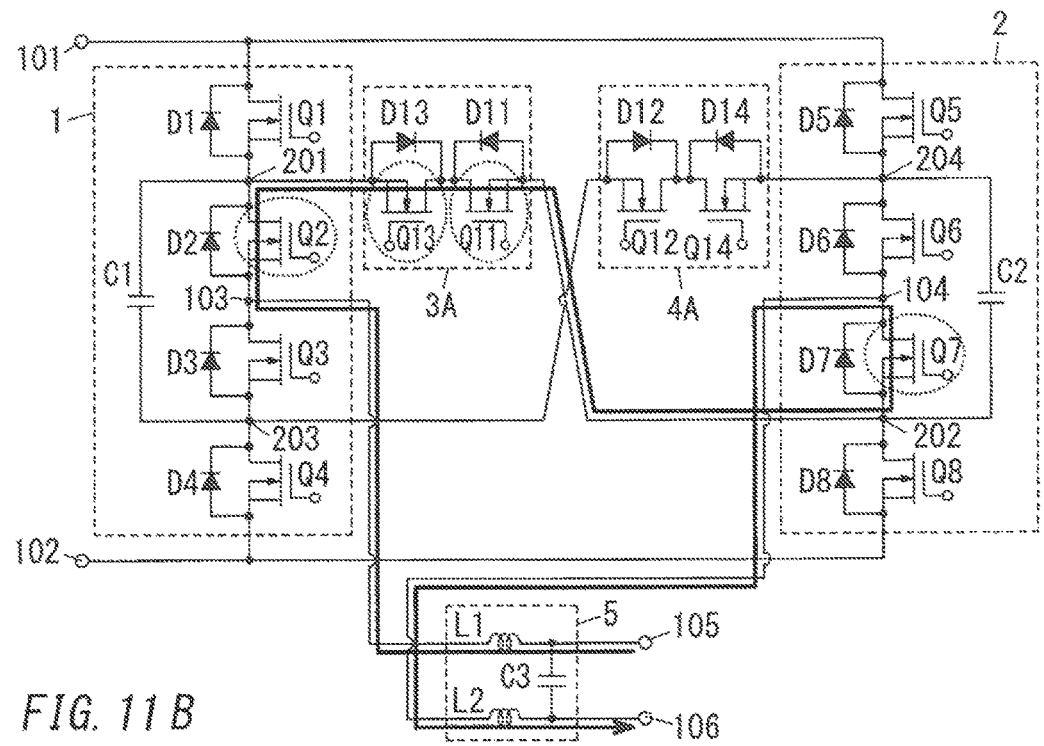
FIG. 11A is a view illustrating a fifth mode of the power-converting device according to the second embodiment.

That is, in the fifth mode illustrated in FIG. 11A, the third switch Q13 as well as the second switching element Q2, the seventh switching element Q7, and the first switch Q11 of the first bidirectional switch 3A is in the on state in a symmetrical manner with respect to the fourth mode. That is, the first bidirectional switch 3A is in the fully on state. In this state, the current path is the same as that of the fifth mode of the first embodiment, but since the first bidirectional switch 3A is in the fully on state, the power-converting device 10 allows a bidirectional flow of a current between the first output point 103 and the second output point 104.

Figure 11B:
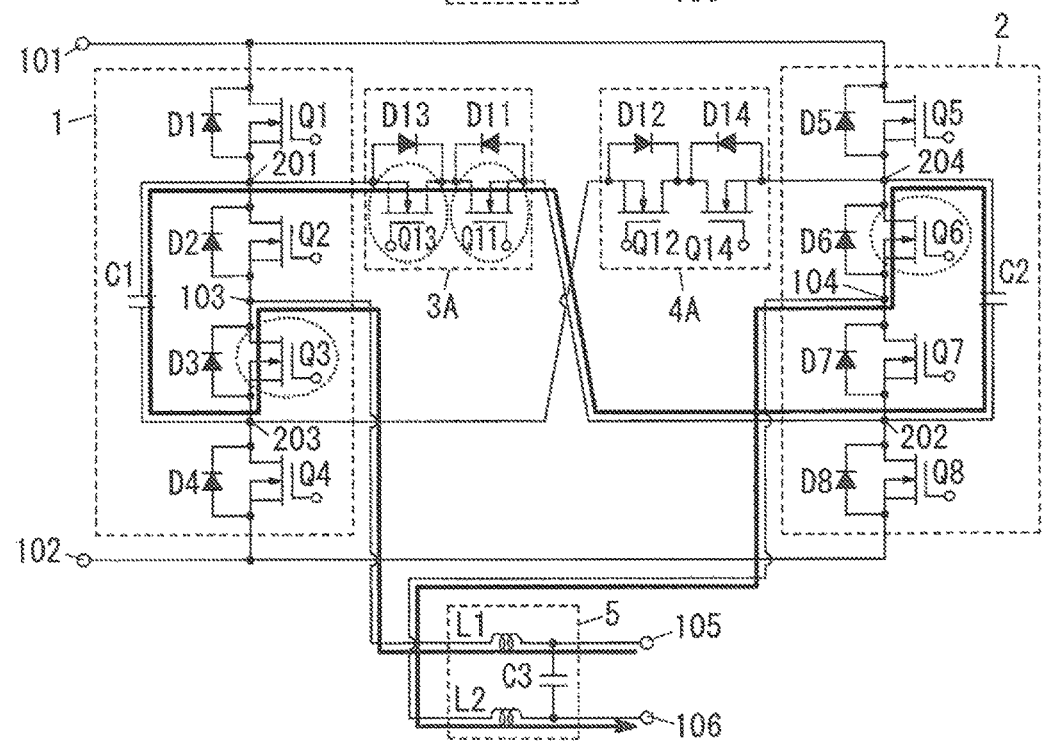
FIG. 11B is a view illustrating the sixth mode of the power-converting device according to the first embodiment.

Next, in the sixth mode illustrated in FIG. 11B, the third switch Q13 as well as the third switching element Q3, the sixth switching element Q6, and the first switch Q11 of the first bidirectional switch 3A is in the on state in a symmetrical manner with respect to the third mode. That is, the first bidirectional switch 3A is in the fully on state. In this state, the current path is the same as that of the sixth mode of the first embodiment, but since the first bidirectional switch 3A is in the fully on state, the power-converting device 10 allows a bidirectional flow of a current between the first output point 103 and the second output point 104.

Figure 12A:
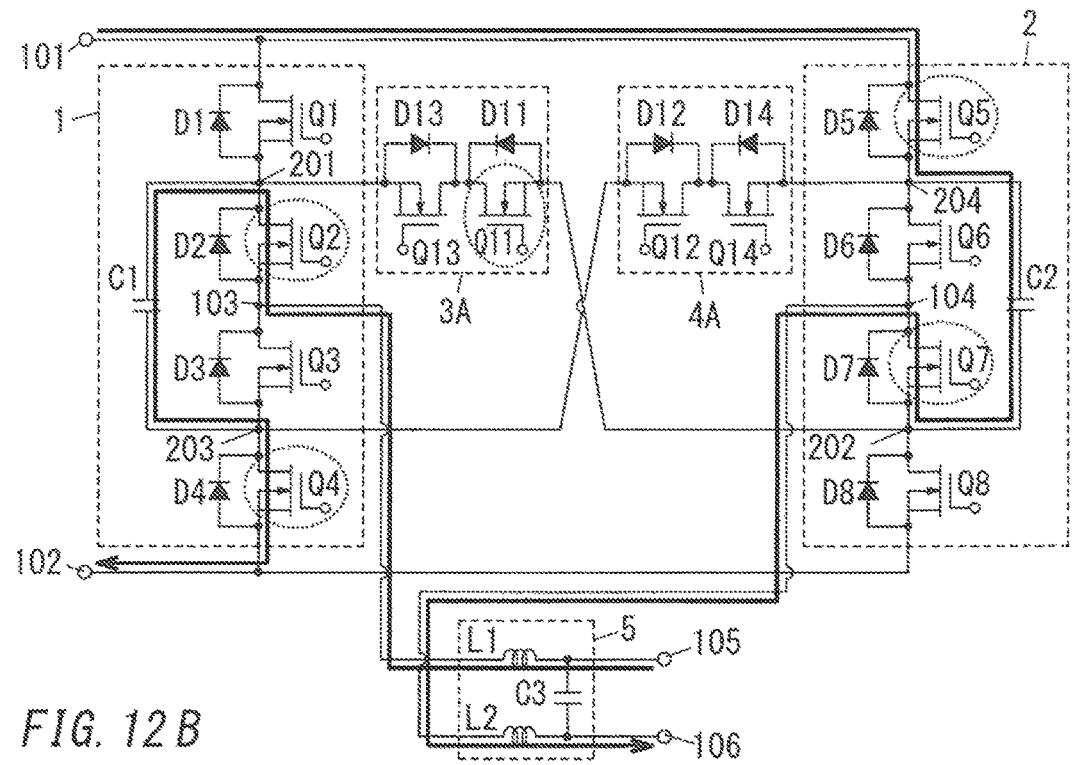
FIG. 12A is a view illustrating a seventh mode of the power-converting device according to the second embodiment.

Next, in the seventh mode illustrated in FIG. 12A, the first switch Q11 of the first bidirectional switch 3A as well as the second and fourth switching elements Q2 and Q4 and fifth and seventh switching elements Q5 and Q7 is in the on state in a symmetrical manner with respect to the second mode. That is, the first bidirectional switch 3A is in the half-on state. Note that in this state, a path through which a current flows is the same as that of the seventh mode of the first embodiment, and no current flows through the first switch Q11.

Figure 12B:
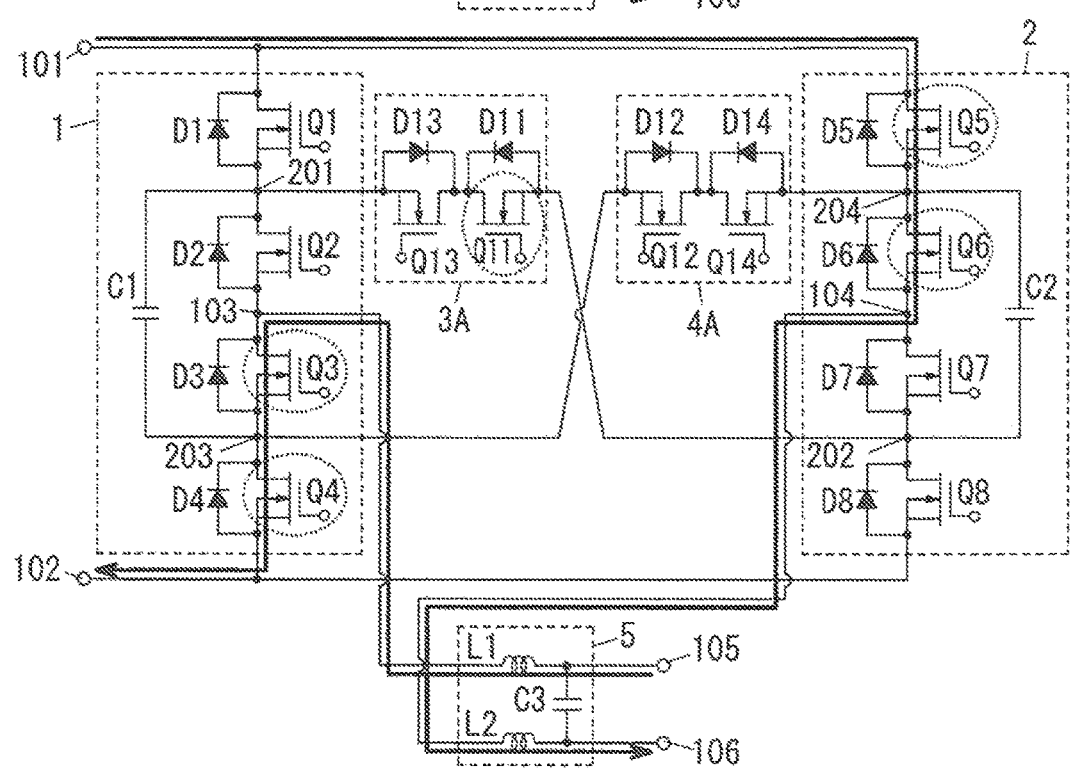
FIG. 12B is a view illustrating the eighth mode of the power-converting device according to the first embodiment.

Next, in the eighth mode illustrated in FIG. 12B, the first switch Q11 of the first bidirectional switch 3A as well as the third and fourth switching elements Q3 and Q4 and the fifth and sixth switching elements Q5 and Q6 is in the on state in a symmetrical manner with respect to the first mode. That is, the first bidirectional switch 3A is in the half-on state. Note that in this state, a path through which a current flows is the same as that of the eighth mode of the first embodiment, and no current flows through the first switch Q11.

Here, in the power-converting device 10 of the present embodiment, the second bidirectional switch 4A is in the fully on state in the third and fourth modes, and the first bidirectional switch 3A is in the fully on state in the fifth and sixth modes. Therefore, in the third to sixth modes, the power-converting device 10 allows a bidirectional flow of a current between the first output point 103 and the second output point 104. A current flowing in directions indicated by the bold arrows in FIGS. 9A, 9B, 10A, 10B, 11A, 11B, 12A, and 12B is hereinafter referred to as a "forward current," and a current flowing oppositely to the forward current is referred to as a "reverse current." That is, in the first to fourth modes in which the final output voltage varies in the range from 0[V] to E[V], a current flowing from the first output point 103 toward the third output point 105 is the forward current. In the fifth to eighth modes in which the final output voltage varies in the range from 0[V] to −E[V], a current flowing from the second output point 104 toward the fourth output point 106 is the forward current.

Therefore, even when the power-converting device 10 operates in the same mode, there are a case where the first capacitor C1 and the second capacitor C2 are charged and a case where the first capacitor C1 and the second capacitor C2 are discharged depending on whether the current flowing through the first capacitor C1 and the second capacitor C2 is the forward current or the reverse current. That is, in a case where the forward current flows, the first capacitor C1 and the second capacitor C2 are charged in the second and seventh modes and are discharged in the third and sixth modes. On the other hand, in a case where the reverse current flows, the first capacitor C1 and the second capacitor C2 are discharged in the second and seventh modes and are charged in the third and sixth modes.

Note that in the following description, it is assumed that the direction of a current flowing through the power-converting device 10 is fixed in the forward direction for simplicity of the description.

The above-described first to eighth modes are summarized in Table 2.

computer 62 determines which of the second mode (charging mode) and the third mode (discharging mode) is selected based on the sensing result of the sensing circuit 63.

Similarly, during the time periods T4 and T6 during which the final output voltage varies in the range from 0[V] to −E/2[V], the controller 6A repeats operation of switching between the fifth to seventh modes as illustrated in Table 2. During the time period T5 during which the final output voltage varies in the range from −E/2[V] to −E[V], the controller 6A repeats operation of switching between the sixth to eighth modes as illustrated in Table 2. In these cases (time periods T4 to T6), the microcomputer 62 determines, based on the sensing result of the sensing circuit 63, which

TABLE 2

| Period | | Output Voltage [V] | Mode | Charging/ Discharging | Q1, Q8 | Q2, Q7 | Q3, Q6 | Q4, Q5 | Q13 | Q11 | Q14 | Q12 |
|---|---|---|---|---|---|---|---|---|---|---|---|---|
| T2 | T1, T3 | +E | 1st | | ON | ON | OFF | OFF | OFF | OFF | OFF | ON |
| | | +E/2 | 2nd | Charging | ON | OFF | ON | OFF | OFF | OFF | OFF | ON |
| | | +E/2 | 3rd | Discharging | OFF | ON | OFF | OFF | OFF | OFF | ON | ON |
| | | 0 | 4th | | OFF | OFF | ON | OFF | OFF | OFF | ON | ON |
| T5 | T4, T6 | 0 | 5th | | OFF | ON | OFF | OFF | ON | ON | OFF | OFF |
| | | −E/2 | 6th | Discharging | OFF | OFF | ON | OFF | ON | ON | OFF | OFF |
| | | −E/2 | 7th | Charging | OFF | ON | OFF | ON | OFF | ON | OFF | OFF |
| | | −E | 8th | | OFF | OFF | ON | ON | OFF | ON | OFF | OFF |

The controller 6A preferably determines whether the first capacitor C1 and the second capacitor C2 are charged or discharged based on the sensing result of the sensing circuit 63. In the present embodiment, the sensing circuit 63 is included in the controller 6A, and the sensing result of the sensing circuit 63 is output to the microcomputer 62. The sensing circuit 63 individually senses the voltage across the first capacitor C1 and the voltage across the second capacitor C2 and outputs the average value Vc of the two voltages as a sensing result to the microcomputer 62. That is, the microcomputer 62 is configured to switch between a charging mode for charging the first capacitor C1 and the second capacitor C2 and a discharging mode for discharging the first capacitor C1 and the second capacitor C2 based on the sensing result of the sensing circuit 63.

Figure 13:
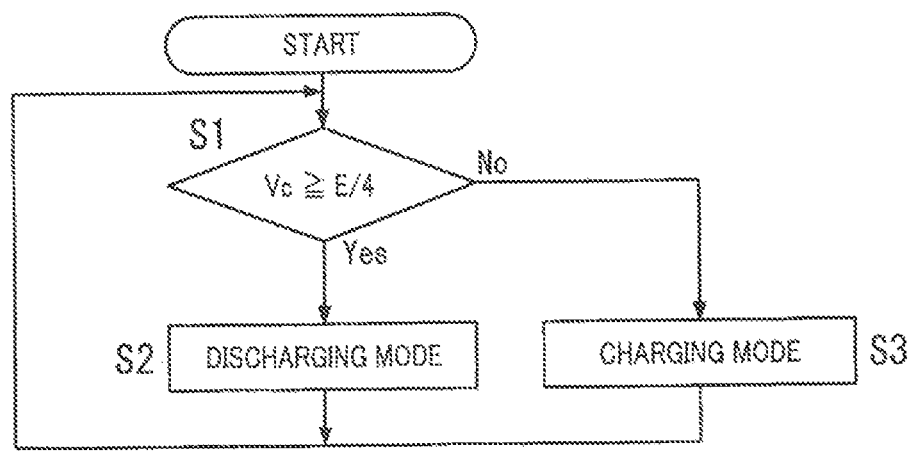
FIG. 13 is a flowchart illustrating operation of the power-converting device according to the second embodiment.

Specifically, as illustrated in FIG. 13, the microcomputer 62 compares the sensing result (average value Vc) of the sensing circuit 63 with the reference voltage (E/4[V]) (S1) to select the charging mode or the discharging mode based on the result of the comparison. When the sensing result of the sensing circuit 63 is greater than or equal to the reference voltage (S1: Yes), the microcomputer 62 selects the discharging mode (S2). When the sensing result of the sensing circuit 63 is less than the reference voltage (S1: No), the microcomputer 62 selects the charging mode (S3).

More specifically, the second and seventh modes correspond to the charging mode because the first capacitor C1 and the second capacitor C2 are charged, whereas the third and sixth modes correspond to the discharging mode because the first capacitor C1 and the second capacitor C2 are discharged. Here, for example, during the time periods T1 and T3 during which the final output voltage varies in the range from 0[V] to E/2[V], the controller 6A repeats operation of switching between the second to fourth modes as illustrated in Table 2. During the time period T2 during which the final output voltage varies in the range from E/2[V] to E[V], the controller 6A repeats operation of switching between the first to third modes as illustrated in Table 2. In these cases (time periods T1 to T3), the microof the sixth mode (discharging mode) and the seventh mode (charging mode) is selected. In these cases (time periods T4 to T6), the microcomputer 62 determines which of the seventh mode (charging mode) and the sixth mode (discharging mode) is selected based on the sensing result of the sensing circuit 63.

With this operation, the voltage across the first capacitor C1 and the voltage across the second capacitor C2 during the basic operation are each maintained at the reference voltage (E/4[V]). Note that the configuration in which the controller 6A determines whether the first capacitor C1 and the second capacitor C2 are charged or discharged based on the sensing result of the sensing circuit 63 is not limited to the present embodiment but is also applicable to the first embodiment.

<Effects>

According to the power-converting device 10 of the present embodiment described above, the first bidirectional switch 3A is configured to be capable of switching between the operational states including the fully off state and the fully on state, and the second bidirectional switch 4A is also configured to be capable of switching between the operational states including the fully off state and the fully on state. That is, in the power-converting device 10 of the present embodiment, the first bidirectional switch 3A is brought into the fully on state, thereby creating a state in which a current can pass bidirectionally between the first connection point 201 and the second connection point 202. In the power-converting device 10 of the present embodiment, the second bidirectional switch 4A is brought into the fully on state, thereby creating a state in which a current is allowed to pass bidirectionally between the third connection point 203 and the fourth connection point 204.

Therefore, with the power-converting device 10, a phase difference may be set, for example, between the final output voltage and an output current which is allowed to flow between the third output point 105 and the fourth output point 106. That is, when the phase difference exists between the output current and the final output voltage, a time period exists during which the output current has a different sign from the final output voltage (for example, the final output voltage is positive and the output current is negative). Therefore, when the phase difference is set between the output current and the final output voltage, the power-converting device 10 has to support the bidirectional flow of a current. Since the power-converting device 10 of the present embodiment supports the bidirectional flow of a current, the phase difference may be set between the output current and the final output voltage.

In particular, in application of the power-converting device 10 to the power conditioner 20 (see FIG. 7) for a photovoltaic generator, the phase difference between the output current and the final output voltage may be set in the power-converting device 10 so as to detect individual operation or to limit rising of the voltage of the system power supply 7. Moreover, in application of the power-converting device 10 to a power conditioner for a power storage apparatus, the phase difference between the output current and the final output voltage may be set so as to cause the power-converting device 10 to control direction of power supply and switch between charging and discharging of the power storage apparatus. The power-converting device 10 of the present embodiment creates a state in which a current is allowed to pass bidirectionally, and therefore, the power-converting device 10 of the present embodiment is applicable to such applications.

According to the power-converting device 10 of the present embodiment, the first bidirectional switch 3A and the second bidirectional switch 4A are brought into the fully on state, thereby reducing losses caused by the first bidirectional switch 3A and the second bidirectional switch 4A. That is, when compared with the configuration in which the first bidirectional switch 3 and the second bidirectional switch 4 include diodes (the ninth diode D110, the tenth diode D120) in the first embodiment, the amount of loss can be reduced by the loss of the diode in the power-converting device 10 of the present embodiment.

As illustrated in the present embodiment, the operational state of the first bidirectional switch 3A preferably further includes an half-on state in which a current flowing from the second connection point 202 to the first connection point 201 is shut off, and a current flowing from the first connection point 201 to the second connection point 202 is allowed to pass. In this case, the operational state of the second bidirectional switch 4A preferably further includes a half-on state in which a current flowing from the third connection point 203 to the fourth connection point 204 is shut off, and a current flowing from the fourth connection point 204 to the third connection point 203 is allowed to pass.

With this configuration, the first bidirectional switch 3A may be in the half-on state in a mode in which a current flowing from first connection point 201 to the second connection point 202 is not needed to be shut off as in the case of seventh and eighth modes. Therefore, controller 6A allows the first switch Q11 to remain in the on state during the time periods (time periods T4 to T6) during which the controller 6A repeats operation of switching between the fifth to seventh modes or between the sixth to eighth modes. That is, in the fifth and sixth modes, the first bidirectional switch 3A is in the fully on state, and the first switch Q11 is in an on state, and therefore, a switching loss of the first switch Q11 may be caused if the first switch Q11 is turned off whenever the mode is switched to the seventh and eighth modes. However, in the power-converting device 10 of the present embodiment, the first switch Q11 remains in the on state when switching between the fifth to seventh modes or switching between the sixth to eighth modes is performed, and therefore, the switching loss caused by the first bidirectional switch 3A can be reduced.

Similarly, in a mode in which a current flowing from the fourth connection point 204 to the third connection point 203 is not needed to be shut off as illustrated in the first and second modes, the second bidirectional switch 4A may be in the half-on state. Therefore, in the power-converting device 10 of the present embodiment, the second switch Q12 remains in the on state when switching between the first to third modes or between the second to fourth modes is performed, and therefore, the switching loss caused by the second bidirectional switch 4A can be reduced.

The controller 6A also allows transition of the first bidirectional switch 3A from the half-on state to the fully on state with a current flowing through the first bidirectional switch 3A, thereby further reducing the switching loss caused by the first bidirectional switch 3A. That is, for example, when the seventh mode is switched to the sixth mode, the controller 6A turns on the third switch Q13 with the thirteenth diode D13 being in the on state, thereby realizing zero-bolt switching of the third switch Q13. Similarly, the controller 6A allows transition of the second bidirectional switch 4A from the half-on state to the fully on state with a current flowing through the second bidirectional switch 4A, thereby further reducing the switching loss caused by the second bidirectional switch 4A.

The specific configurations of the first bidirectional switch 3A and the second bidirectional switch 4A are not limited to those described in the present embodiment but the first bidirectional switch 3A and the second bidirectional switch 4A may be bidirectional switches having the double gate (dual gate) structure as described in, for example, the first embodiment.

Note that in the first embodiment or the second embodiment, examples of the first to eighth switching elements Q1 to Q8 and the first to fourth switches Q11 to Q14 are not limited to depletion type n-channel MOSFETs, but other semiconductor switches may be used. For example, Insulated Gate Bipolar Transistors (IGBTs) or power semiconductor devices including wide bandgap semiconductor material such as gallium nitride (GaN) are used.

Other configurations and functions are similar to those of the first embodiment.

(Third Embodiment)

A power-converting device 10 of the present embodiment is different from the power-converting device 10 of the second embodiment in that a charging circuit is provided to charge a first capacitor C1 and a second capacitor C2 during a start time period before starting the basic operation. The same components as those in the second embodiment are hereinafter denoted by the same reference symbols and the description thereof will be omitted.

The power-converting device 10 of the present embodiment further includes a charging circuit configured to charge a charging target which is at least one of the first capacitor C1 and the second capacitor C2. The charging circuit includes a resistor and a charging switch (switch element). The resistor is electrically connected to a direct current power supply 100 in series with the charging target.

The power-converting device 10 allows at least one of the first capacitor C1 and the second capacitor C2 to be charged without using a filter circuit 5 and without a third output point 105 and a fourth output point 106 being connected to system power supplies 7. In other words, the power-converting device 10 allows capacitors (the first capacitor C1 and the second capacitor C2) required for the regular operation to be charged even when no load is connected between output terminals in a pair (the third output point 105 and the fourth output point 106) (in a non-load state). Note that the regular operation here refers to operation of the power-converting device 10 after a start time period has elapsed, that is, after charging the first capacitor C1 and the second capacitor C2 to the reference voltage (E/4[V]), and the regular operation here is synonymous with the above-described basic operation.

Although detailed description will be given later, the charging circuit basically includes a combination of a resistor and a charging switch. The charging circuit forms a current path including the resistor with the charging switch being in the on state and supplies power from the direct current power supply 100 through the current path to the first capacitor C1 and the second capacitor C2 to charge the first capacitor C1 and the second capacitor C2.

Some configuration examples of the power-converting device 10 of the present embodiment with various circuit configurations of the charging circuit will be described below.

(1) First Configuration Example

Figure 14:
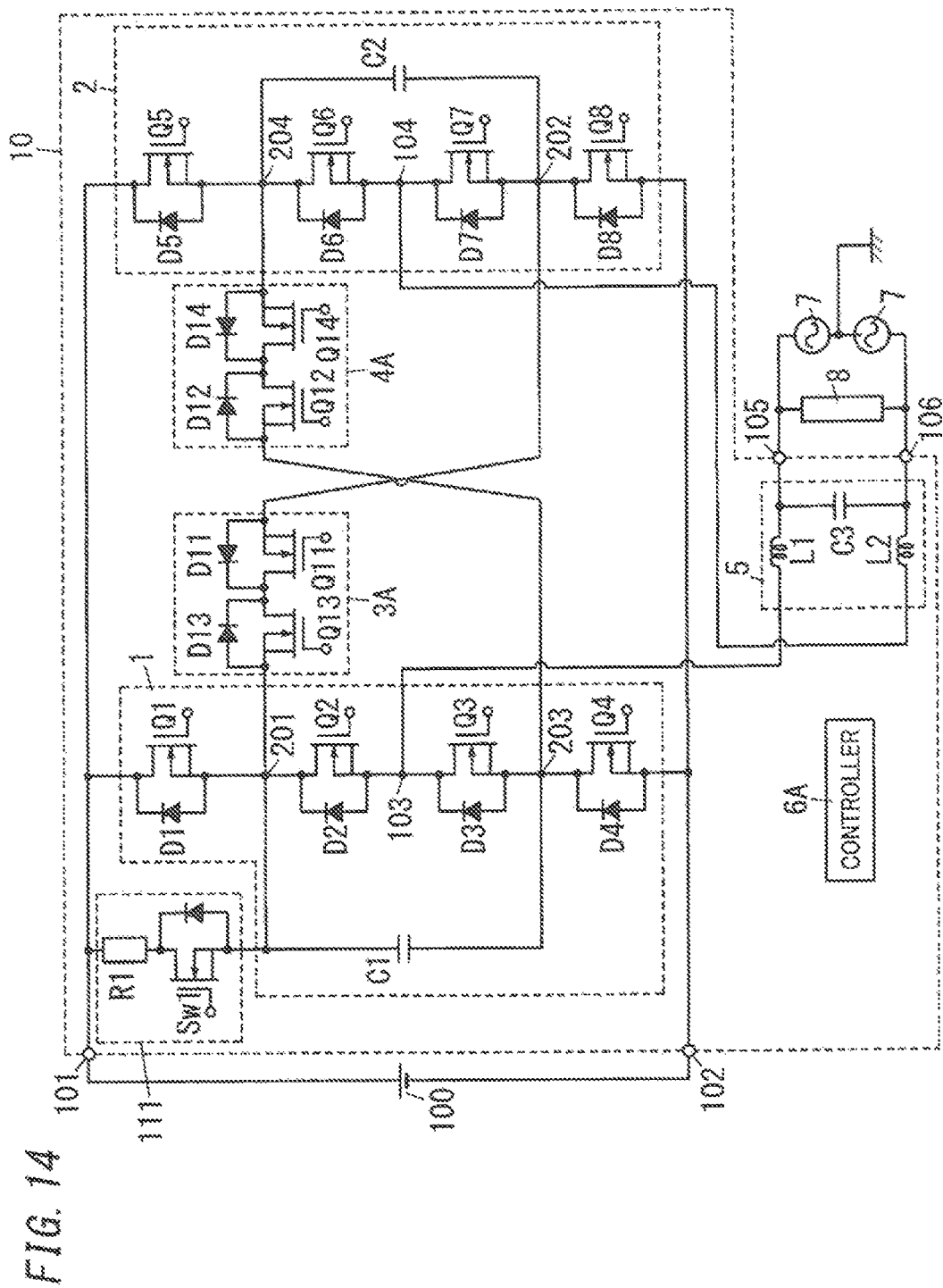
FIG. 14 is a circuit diagram illustrating a first configuration example of a power-converting device according to a third embodiment.

As illustrated in FIG. 14, a power-converting device 10 of a first configuration example includes a charging circuit 111 including a (first) resistor R1 and a (first) charging switch Sw1. In the example illustrated in FIG. 14, the resistor R1 and the charging switch Sw1 are electrically connected in series with each other between a first connection point 201 and a first input point 101. The charging circuit 111 is electrically connected in parallel with a first switching element Q1 between the first connection point 201 and the first input point 101.

Here, the charging switch Sw1 of the charging circuit 111 is a depletion type n-channel MOSFET. The charging switch Sw1 has a source connected to the first connection point 201 and a drain connected to the first input point 101 via the resistor R1. A parasitic diode is further connected in parallel with the charging switch Sw1 with its cathode and anode respectively facing the drain and the source of the charging switch Sw1. The charging switch Sw1 has a gate electrically connected to a controller 6A. The controller 6A is capable of switching on/off the charging switch Sw1, thereby controlling the charging circuit 111.

In the power-converting device 10 of first configuration example, the controller 6A turns on the charging switch Sw1 and a fourth switching element Q4, thereby forming a charging path of a first capacitor C1 between the first input point 101 and the second input point 102. The charging path is a current path including the resistor R1 and the charging switch Sw1 included in the charging circuit 111, and further including the first capacitor C1 and the fourth switching element Q4. The power-converting device 10 allows the first capacitor C1 to be charged by using this current path as a charging path.

The power-converting device 10 turns on the charging switch Sw1, second, third, and eighth switching elements Q2, Q3, and Q8, and a fourth switch Q14 by the controller 6A, thereby forming a charging path of a second capacitor C2 between the first input point 101 and the second input point 102. The charging path is a current path including the resistor R1 and the charging switch Sw1 included in the charging circuit 111 and further including the second capacitor C2, the second, third, and eighth switching elements Q2, Q3, and Q8, the fourth switch Q14, and a twelfth diode D12. The power-converting device 10 allows the second capacitor C2 to be charged by using the current path as a charging path.

According to the first configuration example, the first capacitor C1 and the second capacitor C2 is individually chargeable while commonly using the one charging circuit 111. With this configuration, the power-converting device 10 has a relatively high adjustment accuracy of the voltage across the first capacitor C1 and the voltage across the second capacitor C2.

Further, the power-converting device 10 of the first configuration example allows the first capacitor C1 and the second capacitor C2 to be charged at the same time when operated in a simultaneous charging mode described below.

That is, the power-converting device 10 of the first configuration example turns on the charging switch Sw1, the fourth switch Q14, and the eighth switching element Q8 by the controller 6A in the simultaneous charging mode. With this operation, the power-converting device 10 forms a charging path of the first capacitor C1 and the second capacitor C2 between the first input point 101 and the second input point 102. This charging path is a current path including the resistor R1 and the charging switch Sw1 included in the charging circuit 111 and further including the first capacitor C1, the twelfth diode D12, the fourth switch Q14, the second capacitor C2, and the eighth switching element Q8. The power-converting device 10 allows the first capacitor C1 and the second capacitor C2 to be charged by using this current path as a charging path.

As described above, in the simultaneous charging mode, the first capacitor C1 and the second capacitor C2 are electrically connected in series with each other between the first input point 101 and the second input point 102. Here, when the circuit constant (capacitance) of the first capacitor C1 is equivalent to the circuit constant (capacitance) of the second capacitor C2, the voltage across the first capacitor C1 is equal to the voltage across the second capacitor C2.

The power-converting device 10 uses the simultaneous charging mode as described above to reduce time required for charging the first capacitor C1 and the second capacitor C2, thereby reducing the start time period.

(2) Second Configuration Example

Figure 15:
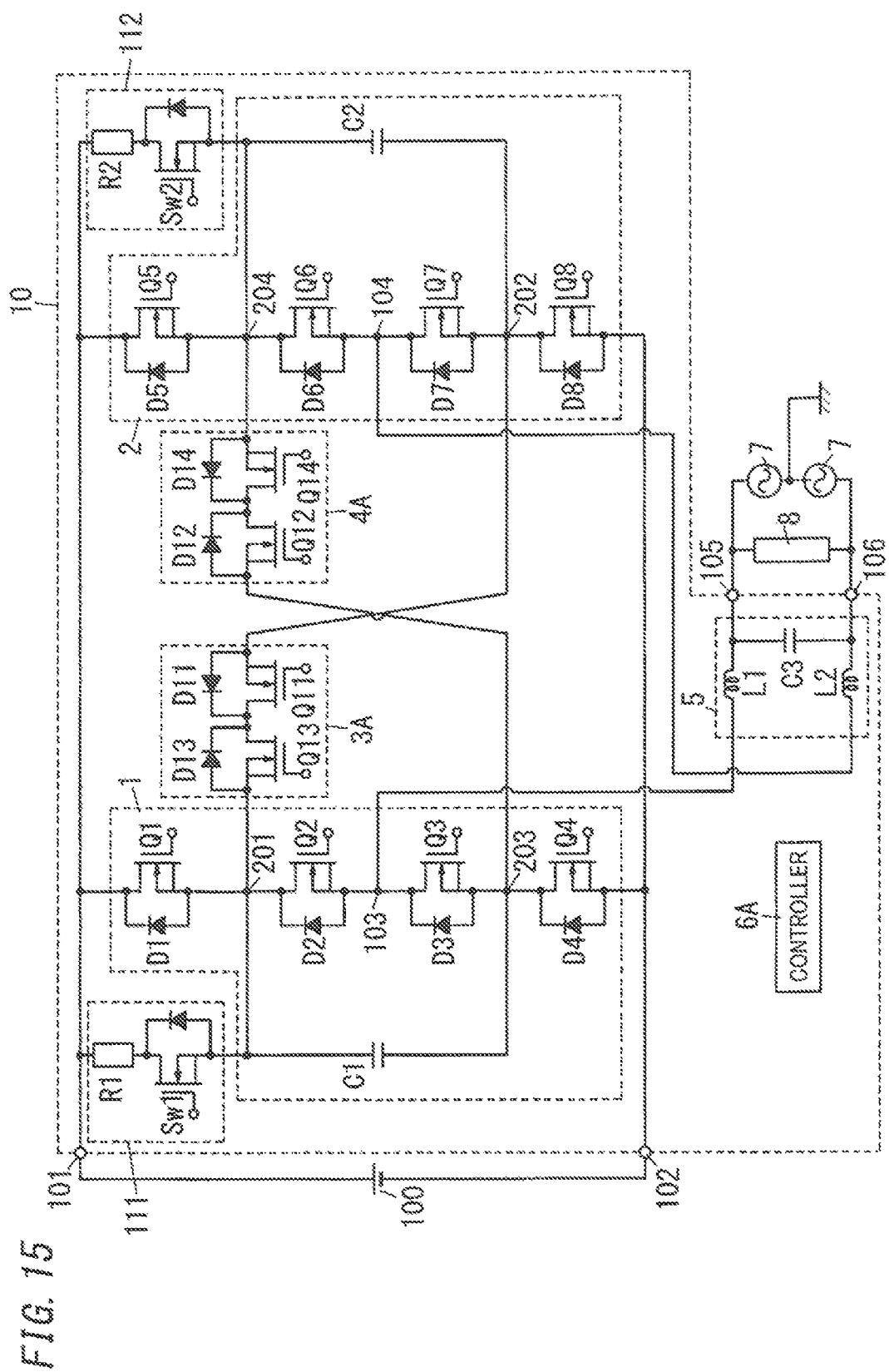
FIG. 15 is a circuit diagram illustrating a second configuration example of the power-converting device according to the third embodiment.

As illustrated in FIG. 15, a power-converting device 10 of a second configuration example includes a (second) charging circuit 112 including a (second) resistor R2 and a (second) charging switch Sw2 in addition to the (first) charging circuit 111 of the first configuration example. In the example illustrated in FIG. 15, the resistor R2 and the charging switch Sw2 are electrically connected in series with each other between a fourth connection point 204 and a first input point 101. The charging circuit 112 is electrically connected in parallel with a fifth switching element Q5 between the fourth connection point 204 and the first input point 101.

Here, the charging switch Sw2 of the charging circuit 112 is a depletion type n-channel MOSFET. The charging switch Sw2 has a source connected to the fourth connection point 204 and a drain connected to the first input point 101 via the resistor R2. A parasitic diode is further connected in parallel with the charging switch Sw2 with its cathode and anode respectively facing the drain and the source of the charging switch Sw2. The charging switch Sw2 has a gate electrically connected to a controller 6A. The controller 6A is capable of switching on/off the charging switch Sw2, thereby controlling the charging circuit 112.

Operation of the power-converting device 10 of the second configuration example at the time of charging a first capacitor C1 is the same as that of the first configuration example.

However, the power-converting device 10 of the second configuration example turns on the charging switch Sw2 and an eighth switching element Q8 by the controller 6A, thereby forming a charging path of a second capacitor C2 between the first input point 101 and the second input point 102. This charging path is a current path including the resistor R2 and the charging switch Sw2 included in the charging circuit 112 and further including the second capacitor C2 and the eighth switching element Q8. The power-converting device 10 allows the second capacitor C2 to be charged by using the current path as a charging path.

With this second configuration example, the first capacitor C1 and the second capacitor C2 respectively use the charging circuits 111 and 112, and therefore, the first capacitor C1 and the second capacitor C2 are individually chargeable. With this configuration, the power-converting device 10 has a relatively high adjustment accuracy of the voltage across the first capacitor C1 and the voltage across the second capacitor C2.

(3) Third Configuration Example

Figure 16:
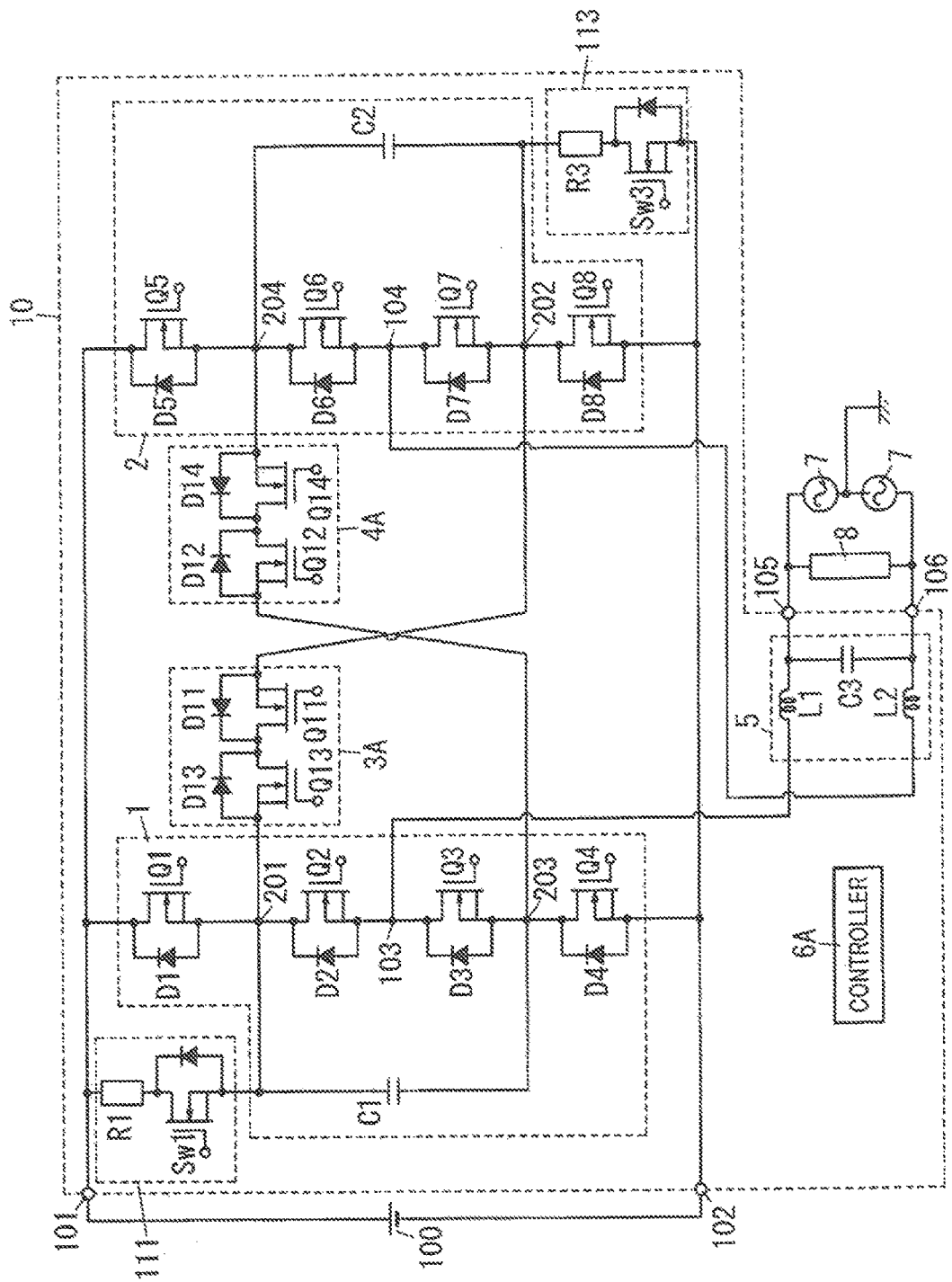
FIG. 16 is a circuit diagram illustrating a third configuration example of the power-converting device according to the third embodiment.

As illustrated in FIG. 16, a power-converting device 10 of a third configuration example includes a (third) charging circuit 113 including a (third) resistor R3 and a (third) charging switch Sw3 in place of the (second) charging circuit 112 of the second configuration example. In the example illustrated in FIG. 16, the resistor R3 and the charging switch Sw3 are electrically connected in series with each other between a second connection point 202 and a second input point 102. The charging circuit 113 is electrically connected in parallel with an eighth switching element Q8 between the second connection point 202 and the second input point 102.

The charging switch Sw3 of the charging circuit 113 is a depletion type n-channel MOSFET. The charging switch Sw3 has a source connected to the second input point 102 and a drain connected to the second connection point 202 via the resistor R3. A parasitic diode is further connected in parallel with the charging switch Sw3 with its cathode and anode facing the drain and the source of the charging switch Sw3. The charging switch Sw3 has a gate electrically connected to a controller 6A. The controller 6A is capable of switching on/off the charging switch Sw3, thereby controlling the charging circuit 113.

Operation of the power-converting device 10 of the third configuration example at the time of charging a first capacitor C1 is the same as that of the first configuration example.

However, the power-converting device 10 of the third configuration example turns on the charging switch Sw3 and a fifth switching element Q5 by the controller 6A, thereby forming a charging path of a second capacitor C2 between a first input point 101 and the second input point 102. The charging path is a current path including the resistor R3 and the charging switch Sw3 included in the charging circuit 113 and further including the second capacitor C2 and the fifth switching element Q5. The power-converting device 10 allows the second capacitor C2 to be charged by using the current path as a charging path.

According to the third configuration example, the first capacitor C1 and the second capacitor C2 respectively use the charging circuits 111 and 113, and therefore, the first capacitor C1 and the second capacitor C2 are individually chargeable. With this configuration, the power-converting device 10 has a relatively high adjustment accuracy of the voltage across the first capacitor C1 and the voltage across the second capacitor C2.

(4) Fourth Configuration Example

Figure 17:
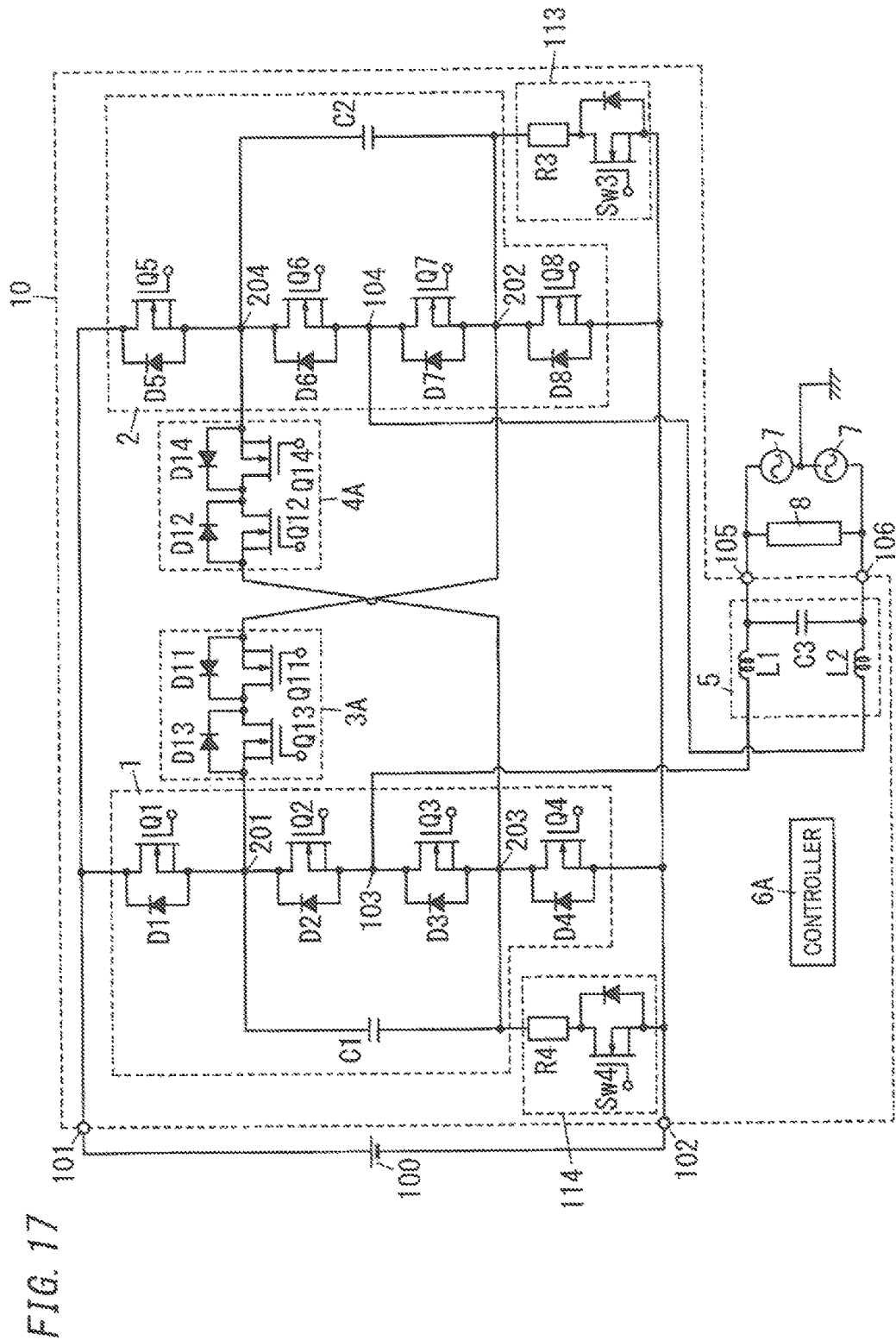
FIG. 17 is a circuit diagram illustrating a fourth configuration example of the power-converting device according to the third embodiment.

As illustrated in FIG. 17, a power-converting device 10 of a fourth configuration example includes a (fourth) charging circuit 114 including a (fourth) resistor R4 and a (fourth) charging switch Sw4 in place of the (first) charging circuit 111 of the third configuration example. In the example illustrated in FIG. 17, the resistor R4 and the charging switch Sw4 are electrically connected in series with each other between a third connection point 203 and a second input point 102. The charging circuit 114 is electrically connected in parallel with a fourth switching element Q4 between the third connection point 203 and the second input point 102.

The charging switch Sw4 of the charging circuit 114 is a depletion type n-channel MOSFET. The charging switch Sw4 has a source connected to the second input point 102 and a drain connected to the third connection point 203 via the resistor R4. A parasitic diode is further connected in parallel to the charging switch Sw4 with its cathode and anode respectively facing the drain and the source of the charging switch Sw4. The charging switch Sw4 has a gate electrically connected to a controller 6A. The controller 6A is capable of switching on/off the charging switch Sw4, thereby controlling the charging circuit 114.

The power-converting device 10 of the fourth configuration example turns on the charging switch Sw4 and a first switching element Q1 by the controller 6A, thereby forming a charging path of a first capacitor C1 between a first input point 101 and the second input point 102. The charging path is a current path including the resistor R4 and the charging switch Sw4 included in the charging circuit 114 and further including the first capacitor C1 and the first switching element Q1. The power-converting device 10 enables the first capacitor C1 to be charged by using the current path as a charging path.

Operation of this power-converting device 10 at the time of charging the first capacitor C1 is the same as that of the third configuration example.

According to the fourth configuration example, the first capacitor C1 and a second capacitor C2 respectively use a charging circuit 113 and the charging circuit 114, and therefore, the first capacitor C1 and the second capacitor C2 are individually chargeable. With this configuration, the power-converting device 10 has a relatively high adjustment accuracy of the voltage across the first capacitor C1 and the voltage across the second capacitor C2.

(5) Fifth Configuration Example

Figure 18:
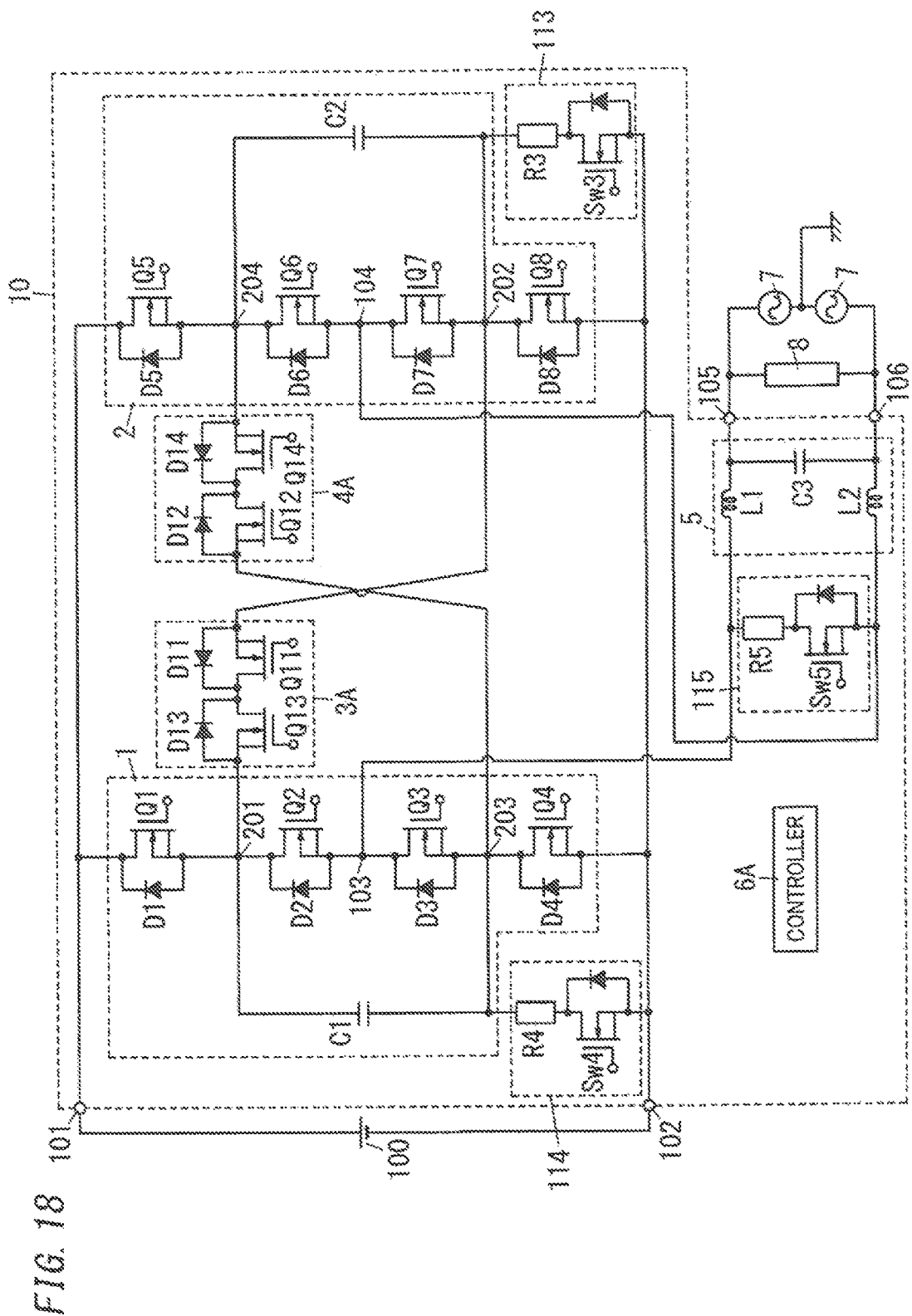
FIG. 18 is a circuit diagram illustrating a fifth configuration example of the power-converting device according to the third embodiment.

As illustrated in FIG. 18, a power-converting device 10 of a fifth configuration example includes a (fifth) charging circuit 115 including a (fifth) resistor R5 and a (fifth) charging switch Sw5 in addition to the (third) charging circuit 113 and the (fourth) charging circuit 114 of the fourth configuration example. In the example illustrated in FIG. 18, the resistor R5 and the charging switch Sw5 are electrically connected in series with each other between a first output point 103 and a second output point 104. The charging circuit 115 is electrically connected in parallel to a filter circuit 5 between the first output point 103 and a second output point 104.

The charging switch Sw5 of the charging circuit 115 is a depletion type n-channel MOSFET. The charging switch Sw5 has a source connected to the second output point 104 and a drain connected to the first output point 103 via the resistor R5. A parasitic diode is further connected in parallel with the charging switch Sw5 with its cathode and anode respectively facing the drain and the source of the charging switch Sw5. The charging switch Sw5 has a gate electrically connected to a controller 6A. The controller 6A is capable of switching on/off the charging switch Sw5, thereby controlling the charging circuit 115.

Operation of the power-converting device 10 of the fourth configuration example at the time of individually charging a first capacitor C1 and a second capacitor C2 is the same as that of the third configuration example.

However, the power-converting device 10 of the fourth configuration example turns on the charging switch Sw5 and first and eighth switching elements Q1 and Q8 by the controller 6A, thereby forming a charging path of the first capacitor C1 and the second capacitor C2 between a first input point 101 and a second input point 102. The charging path is a current path including the resistor R5 and the charging switch Sw5 included in the charging circuit 115 and further including the first capacitor C1, second capacitor C2, and the first and eighth switching elements Q1 and Q8. The power-converting device 10 allows both the first capacitor C1 and the second capacitor C2 to be charged at the same time by using the current path as a charging path.

According to the fifth configuration example, the first capacitor C1 and the second capacitor C2 respectively use the charging circuits 113 and 114, and therefore, the first capacitor C1 and the second capacitor C2 are individually be chargeable. With this configuration, the power-converting device 10 has a relatively high adjustment accuracy of the voltage across the first capacitor C1 and the voltage across the second capacitor C2. In addition, the power-converting device 10 allows the first capacitor C1 and the second capacitor C2 to be charged at the same time by using the charging circuit 115.

Figure 19:
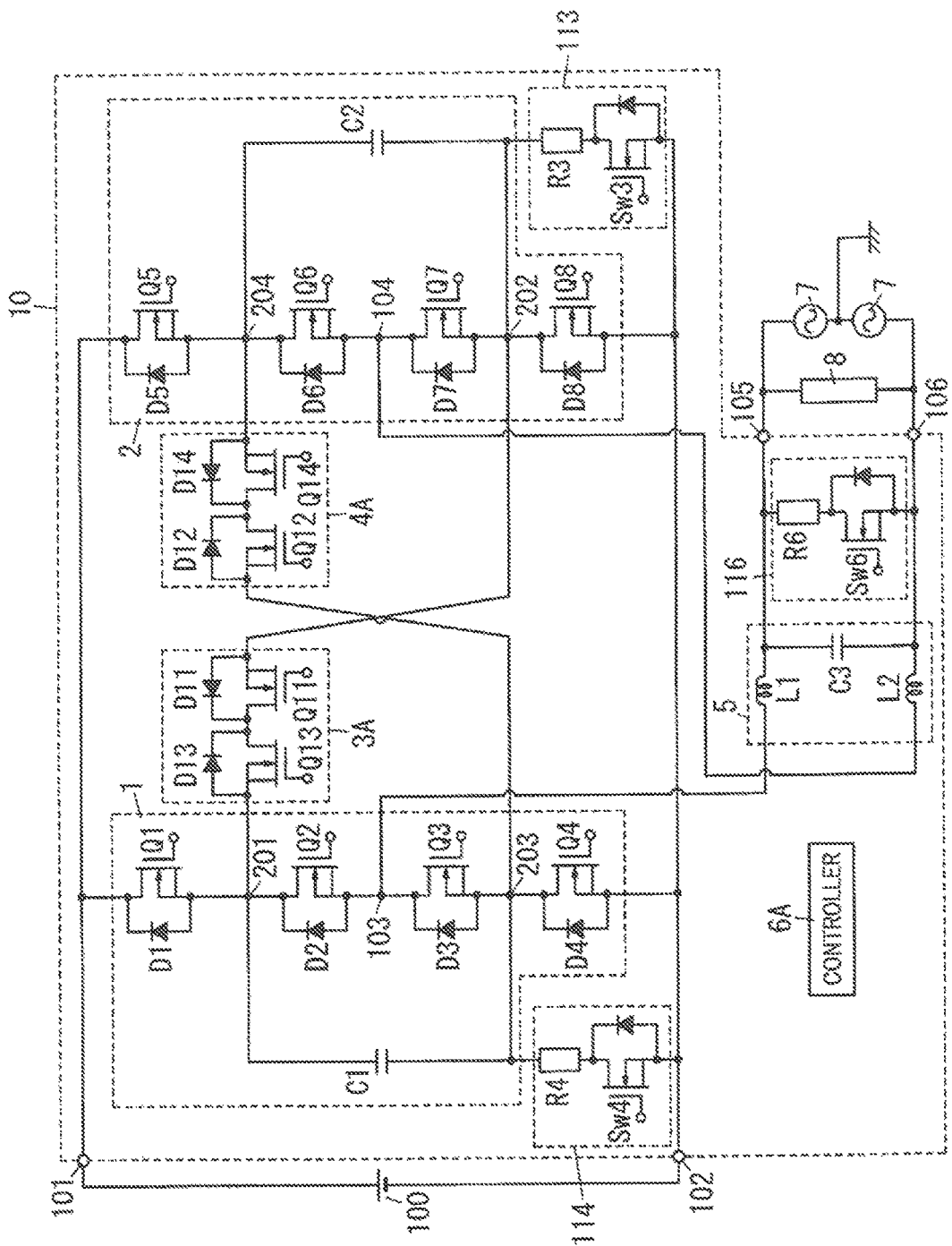
FIG. 19 is a circuit diagram illustrating a variation of the fifth configuration example of the power-converting device according to the third embodiment.

FIG. 19 shows a variation of the fifth configuration example. The variation includes a (sixth) charging circuit 116 including a (sixth) resistor R6 and a (sixth) charging switch Sw6 in place of the (fifth) charging circuit 115 of the fifth configuration example. The charging circuit 116 of FIG. 19 is different from the charging circuit 115 of the fifth configuration example in that the charging circuit 116 is not disposed between the filter circuit 5 and each of the first output point 103 and the second output point 104 but is disposed between the filter circuit 5 and each of the third output point 105 and the fourth output point 106.

The power-converting device 10 is preferably configured to discharge a first capacitor C1 or a second capacitor C2 by a charging circuit 111 when the voltage across the first capacitor C1 or across the second capacitor C2 exceeds the reference voltage (E/4[V]). For example, in the power-converting device 10 of the first configuration example, the charging switch Sw1 and the first to third switching elements Q1 to Q3 are turned on by the controller 6A, thereby forming a current path including the charging circuit 111 to discharge the first capacitor C1.

Other configurations and other functions are similar to those of the second embodiment. Note that the configuration of the third embodiment may be combined not only with the configuration of the second embodiment but also with the configuration of the first embodiment.

The invention claimed is:

1. A power-converting device, comprising:
   a first conversion circuit;
   a second conversion circuit;
   a first bidirectional switch; and
   a second bidirectional switch, wherein
   the first conversion circuit and the second conversion circuit are electrically connected in parallel with each other between a first input point on a high potential side of a direct current power supply and a second input point on a low potential side of the direct current power supply,
   the first conversion circuit includes
      first to fourth switching elements electrically connected in series with each other between the first input point and the second input point in an order of the first switching element, the second switching element, the third switching element, and the fourth switching element from the first input point, and
      a first capacitor electrically connected in parallel with a series circuit of the second switching element and the third switching element,
      a connection point of the second switching element and the third switching element being a first output point,
   the second conversion circuit includes
      fifth to eighth switching elements electrically connected in series with each other between the first input point and the second input point in an order of the fifth switching element, the sixth switching element, the seventh switching element, and the eighth switching element from the first input point, and
      a second capacitor electrically connected in parallel with a series circuit of the sixth switching element and the seventh switching element,
      a connection point of the sixth switching element and the seventh switching element being a second output point,
   the first bidirectional switch is electrically connected between a first connection point which is a connection point of the first switching element and the second switching element and a second connection point which is a connection point of the seventh switching element and the eighth switching element,
   the second bidirectional switch is electrically connected between a third connection point which is a connection point of the third switching element and the fourth switching element and a fourth connection point which is a connection point of the fifth switching element and the sixth switching element, and
   the power-converting device is configured to generate an output voltage between the first output point and the second output point.

2. The power-converting device according to claim 1, wherein
   the first bidirectional switch is configured to be capable of switching between operational states including
      a fully off state in which a bidirectional flow of a current is shut off between the first connection point and the second connection point and
      a fully on state in which a current is allowed to pass bidirectionally between the first connection point and the second connection point, and
   the second bidirectional switch is configured to be capable of switching between operational states including
      a fully off state in which a bidirectional flow of a current is shut off between the third connection point and the fourth connection point and
      a fully on state in which a current is allowed to pass bidirectionally between the third connection point and the fourth connection point.

3. The power-converting device according to claim 2, wherein
   the operational states of the first bidirectional switch further include a half-on state in which a current flowing from the second connection point to the first connection point is shut off and a current flowing from the first connection point to the second connection point is allowed to pass, and the operational states of the second bidirectional switch further include a half-on state in which a current flowing from the third connection point to the fourth connection point is shut off and a current flowing from the fourth connection point to the third connection point is allowed to pass.

4. The power-converting device according to claim 3, further comprising a controller configured to control control targets which are the first to fourth switching elements, the fifth to eighth switching elements, the first bidirectional switch, and the second bidirectional switch to generate the output voltage between the first output point and the second output point.

5. The power-converting device according to claim 3, wherein the output voltage is an alternate current voltage.

6. A power conditioner, comprising: the power-converting device according to claim 3; and a disconnection device electrically connected between a system power supply and each of the first output point and the second output point.

7. The power-converting device according to claim 2, further comprising a controller configured to control control targets which are the first to fourth switching elements, the fifth to eighth switching elements, the first bidirectional switch, and the second bidirectional switch to generate the output voltage between the first output point and the second output point.

8. The power-converting device according to claim 2, wherein the output voltage is an alternate current voltage.

9. The power-converting device according to claim 2, further comprising a filter circuit electrically connected between the first output point and the second output point to form a current path between the first output point and the second output point.

10. The power-converting device according to claim 2, further comprising a charging circuit configured to charge a charging target which is at least one of the first capacitor and the second capacitor, wherein the charging circuit includes a resistor and a charging switch electrically connected to the direct current power supply in series with the charging target.

11. A power conditioner, comprising: the power-converting device according to claim 2; and a disconnection device electrically connected between a system power supply and each of the first output point and the second output point.

12. The power-converting device according to claim 1, further comprising a controller configured to control control targets which are the first to fourth switching elements, the fifth to eighth switching elements, the first bidirectional switch, and the second bidirectional switch to generate the output voltage between the first output point and the second output point.

13. The power-converting device according to claim 12, wherein the controller controls the control targets to repeat charging and discharging of each of the first capacitor and the second capacitor with a reference voltage as a center, the reference voltage being ¼ of a voltage applied between the first input point and the second input point from the direct current power supply.

14. The power-converting device according to claim 13, wherein the controller controls the control targets to vary a magnitude of the output voltage in five stages.

15. The power-converting device according to claim 12, wherein the controller controls the control targets to vary a magnitude of the output voltage in five stages.

16. The power-converting device according to claim 1, wherein the output voltage is an alternate current voltage.

17. The power-converting device according to claim 1, further comprising a filter circuit electrically connected between the first output point and the second output point to form a current path between the first output point and the second output point.

18. The power-converting device according to claim 1, further comprising a charging circuit configured to charge a charging target which is at least one of the first capacitor and the second capacitor, wherein the charging circuit includes a resistor and a charging switch electrically connected to the direct current power supply in series with the charging target.

19. A power conditioner, comprising:

the power-converting device according to claim 1; and a disconnection device electrically connected between a system power supply and each of the first output point and the second output point.

* * * * *